US012118199B2

(12) United States Patent
Zhang

(10) Patent No.: US 12,118,199 B2
(45) Date of Patent: Oct. 15, 2024

(54) FACE PICTURE INFORMATION DISPLAY METHOD AND TERMINAL DEVICE

(71) Applicant: VIVO MOBILE COMMUNICATION CO., LTD., Dongguan (CN)

(72) Inventor: Yubing Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 155 days.

(21) Appl. No.: 17/355,158

(22) Filed: Jun. 22, 2021

(65) Prior Publication Data
US 2021/0318787 A1 Oct. 14, 2021

Related U.S. Application Data

(63) Continuation of application No. PCT/CN2019/127150, filed on Dec. 20, 2019.

(30) Foreign Application Priority Data

Dec. 24, 2018 (CN) .......................... 201811584408.2

(51) Int. Cl.
*G06F 3/0486* (2013.01)
*G06F 3/0482* (2013.01)
(Continued)

(52) U.S. Cl.
CPC .......... *G06F 3/0486* (2013.01); *G06F 3/0482* (2013.01); *G06F 16/532* (2019.01); *H04M 1/27475* (2020.01); *H04M 1/724* (2021.01)

(58) Field of Classification Search
CPC .... G06F 3/0486; G06F 3/0482; G06F 16/532; G06F 3/04817; G06F 3/04883;
(Continued)

(56) References Cited

U.S. PATENT DOCUMENTS 9,798,443 B1 * 10/2017 Gray ...................... G06F 3/0488
9,912,870 B2 * 3/2018 Yu ....................... H04N 5/23218
(Continued)

FOREIGN PATENT DOCUMENTS

CN          102655544 A        9/2012
CN          102693088 A        9/2012
(Continued)

OTHER PUBLICATIONS

International Search Report issued in corresponding International Application No. PCT/CN2019/127150, mailed Mar. 9, 2020, 4 pages.
(Continued)

*Primary Examiner* — Tuyetlien T Tran
*Assistant Examiner* — Jianmei F Duckworth
(74) *Attorney, Agent, or Firm* — IPX PLLC

(57) ABSTRACT

The embodiments of the present disclosure provide an information display method and a terminal device. The information display method includes: receiving a first input that is performed by a user on a first picture; displaying M face pictures and icons of K messaging programs in response to the first input, where the first picture includes the M face pictures; receiving a second input that is performed by the user; and displaying N face pictures and T pieces of first information in response to the second input, where the N face pictures are face pictures that are of the M face pictures and that correspond to the second input, each piece of first information corresponds to at least one face picture, one piece of first information is information of a user indicated by at least one face picture corresponding to the first information, and each piece of first information includes information in at least one first messaging program of the K messaging programs.

18 Claims, 18 Drawing Sheets

(51) Int. Cl.
*G06F 16/532* (2019.01)
*H04M 1/27475* (2020.01)
*H04M 1/724* (2021.01)

(58) Field of Classification Search
CPC ............... H04M 1/2745; H04M 1/725; H04M 1/27475; H04M 1/724
See application file for complete search history.

(56) References Cited

U.S. PATENT DOCUMENTS

| | | | |
|---|---|---|---|
| 10,552,471 B1* | 2/2020 | Dandekar | G06F 16/56 |
| 10,691,314 B1* | 6/2020 | Freeman | G06F 3/04842 |
| 2005/0091272 A1* | 4/2005 | Smith | G06Q 10/06 |
| 2008/0176602 A1* | 7/2008 | Kim | H04M 1/27475 |
| | | | 455/566 |
| 2009/0268888 A1* | 10/2009 | Hsu | H04M 1/27475 |
| | | | 379/93.23 |
| 2011/0061006 A1* | 3/2011 | Song | H04M 1/72445 |
| | | | 455/566 |
| 2011/0256907 A1* | 10/2011 | Lee | H04M 1/27475 |
| | | | 455/566 |
| 2013/0077833 A1* | 3/2013 | Kritt | G06V 20/30 |
| | | | 382/118 |
| 2013/0219342 A1* | 8/2013 | Nosou | G06Q 10/107 |
| | | | 715/835 |
| 2014/0049498 A1 | 2/2014 | Ma et al. | |
| 2014/0063053 A1* | 3/2014 | Jung | H04M 1/27457 |
| | | | 345/629 |
| 2014/0101617 A1* | 4/2014 | Yang | G06V 40/172 |
| | | | 715/846 |
| 2014/0157290 A1* | 6/2014 | Li | G06F 3/04845 |
| | | | 719/328 |
| 2014/0181089 A1* | 6/2014 | Desmond | G06F 16/51 |
| | | | 707/722 |
| 2014/0223346 A1* | 8/2014 | Lin | G06F 3/0486 |
| | | | 715/769 |
| 2015/0178553 A1* | 6/2015 | Yoo | G06F 16/434 |
| | | | 382/118 |
| 2015/0213305 A1* | 7/2015 | Sundstrom | G06V 40/161 |
| | | | 382/118 |
| 2016/0011737 A1* | 1/2016 | Kang | G06F 16/94 |
| | | | 715/838 |
| 2016/0062611 A1* | 3/2016 | Liang | G06F 3/0482 |
| | | | 345/173 |

FOREIGN PATENT DOCUMENTS

| | | |
|---|---|---|
| CN | 103024118 A | 4/2013 |
| CN | 105320407 A | 2/2016 |
| CN | 106534452 A | 3/2017 |
| CN | 108763254 A | 11/2018 |
| CN | 108845732 A | 11/2018 |
| CN | 109889654 A | 6/2019 |

OTHER PUBLICATIONS

First Office Action issued in related Chinese Application No. 201811584408.2, mailed Mar. 2, 2020, 9 pages.

* cited by examiner

FACE PICTURE INFORMATION DISPLAY METHOD AND TERMINAL DEVICE

CROSS-REFERENCE OF RELATED APPLICATION

This application is a bypass continuation of PCT Application No. PCT/CN2019/127150 filed Dec. 20, 2019, which claims priority to Chinese Patent Application No. 201811584408.2 filed in China on Dec. 24, 2018, both of which are incorporated herein by reference in their entireties.

TECHNICAL FIELD

Embodiments of the present disclosure relate to the field of communications technologies, and in particular, to an information display method and a terminal device.

BACKGROUND

With the rapid popularization of terminal devices, terminal devices have become indispensable in lives of users.

At present, users add more and more contacts in various applications, and some users may add hundreds or thousands of contacts. As a result, in some social situations, when a user 1 needs to chat with another user, the user 1 may need to manually search a contact list or contact updates in each application on a terminal device, to determine specific information of another user, because the user 1 cannot determine the name of another user and related matters.

However, because the user needs to manually search a large amount of information (such as contacts or contact updates) in the above query manner, the above query manner takes a long time, and the accuracy of a query result is low.

SUMMARY

The embodiments of the present disclosure provide an information display method and a terminal device to solve the problem that the traditional query manner takes a long time, and the accuracy of a query result is low.

To solve the foregoing technical problem, embodiments of this disclosure are implemented as follows:

In a first aspect, the embodiments of the present disclosure provide an information display method. The method includes: receiving a first input that is performed on a first picture by a user; displaying M face pictures and icons of K messaging programs in response to the first input, where the first picture includes the M face pictures; receiving a second input that is performed by the user; and displaying N face pictures and T pieces of first information in response to the second input, where the N face pictures are face pictures that are of the M face pictures and that correspond to the second input, each piece of first information corresponds to at least one face picture, one piece of first information is information of a user indicated by at least one face picture corresponding to the first information, each piece of first information includes information in at least one first messaging program of the K messaging programs, M, K, N, and T are all positive integers, and N is less than or equal to M.

In a second aspect, the embodiments of the present disclosure further provide a terminal device. The terminal device includes: a receiving module and a display module. The receiving module is configured to receive a first input that is performed by a user on a first picture. The display module is configured to display M face pictures and icons of K messaging programs in response to the first input received by the receiving module, where the first picture includes the M face pictures. The receiving module is further configured to receive a second input that is performed by the user. The display module is further configured to display N face pictures and T pieces of first information in response to the second input received by the receiving module, where the N face pictures are face pictures that are of the M face pictures and that correspond to the second input, each piece of first information corresponds to at least one face picture, one piece of first information is information of a user indicated by at least one face picture corresponding to the first information, each piece of first information includes information in at least one first messaging program of the K messaging programs, M, K, N, and T are all positive integers, and N is less than or equal to M.

According to a third aspect, the embodiments of the present disclosure provide a terminal device, including: a processor, a memory, and a computer program stored in the memory and executable on the processor, where the computer program, when executed by the processor, implements the steps of the information display method according to the foregoing first aspect.

According to a fourth aspect, the embodiments of the present disclosure provide a computer-readable storage medium, where a computer program is stored in the computer-readable storage medium, and the computer program, when executed by a processor, implements the steps of the information display method according to the foregoing first aspect.

In the embodiments of the present disclosure, first, the terminal device receives a first input that is performed by a user on a first picture; and then displays M face pictures and icons of K messaging programs in response to the first input, where the first picture includes the M face pictures. Further, the terminal device receives a second input that is performed by the user. Finally, the terminal device displays N face pictures and T pieces of first information in response to the second input. One piece of first information is information of a user indicated by at least one face picture corresponding to the first information, and each piece of first information includes information in at least one first messaging program of the K messaging programs. Because the terminal device can display, based on a face picture in a picture, information of a user in a messaging program corresponding to the face picture, a user can quickly determine, according to the information of the user displayed on the terminal device, whether the user is a contact that the user needs to search for, and there is no need to manually search a large amount of information. Therefore, in the information display method provided in the embodiments of the present disclosure, query is fast and accuracy of the query result is high.

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be noted that, in this specification, "I" indicates or, for example, A/B may indicate A or B, and "and/or" is merely an association relationship that describes associated objects, and represents that there may be three relationships. For example, A and/or B may represent three cases: only A exists, both A and B exist, and only B exists. "Multiple" means two or more.

In the specification and claims of the present disclosure, the terms such as "first" and "second" are used to distinguish between different objects, but are not used to describe a particular sequence of the objects. For example, the first information, the second information, and the like are used to distinguish between different information, and are not used to describe a particular sequence of the information.

It should be noted that in the embodiments of the present disclosure, the term such as "exemplary" or "for example" is used to indicate an example, an instance, or a description. Any embodiment or design scheme described as an "exemplar" or "example" in the embodiments of the present disclosure should not be explained as being more preferred or having more advantages than another embodiment or design scheme. Specifically, the words such as "exemplary" or "for example" are used to present related concepts in a specific manner.

The terminal device provided in the embodiments of the present disclosure may be a terminal device with an operating system. The operating system may be an Android (Android) operating system, or may be an IOS operating system or other possible operating systems, which is not specifically limited in the embodiments of the present disclosure.

The following uses the Android operating system as an example to introduce a software environment applicable to the information display method provided by the embodiments of the present disclosure.

Figure 1:
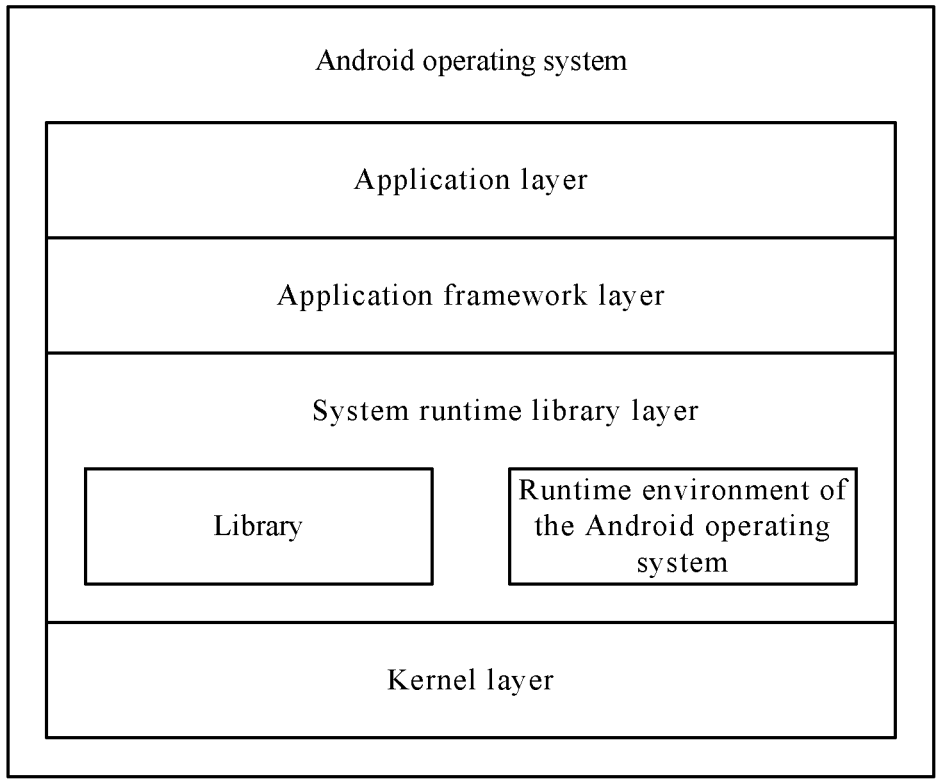
FIG. 1 is a schematic architectural diagram of a possible Android operating system according to an embodiment of the present disclosure.

FIG. 1 is a schematic architectural diagram of a possible Android operating system according to an embodiment of the present disclosure. In FIG. 1, the architecture of the Android operating system includes 4 layers, namely: an application layer, an application framework layer, a system runtime library layer, and a kernel layer (specifically, it may be the Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (also called a system library) and a runtime environment of the Android operating system. The library mainly provides various resources needed by the Android operating system. The runtime environment of the Android operating system is used to provide a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present disclosure, based on the system architecture of the Android operating system as shown in FIG. 1, developers can develop software programs that implement the information display method provided by the embodiments of the present disclosure, so that the information display method can be performed based on the Android operating system as shown in FIG. 1. That is, by running the software program in the Android operating system, the processor or the terminal device can implement the information display method provided by the embodiments of the present disclosure.

Figure 2:
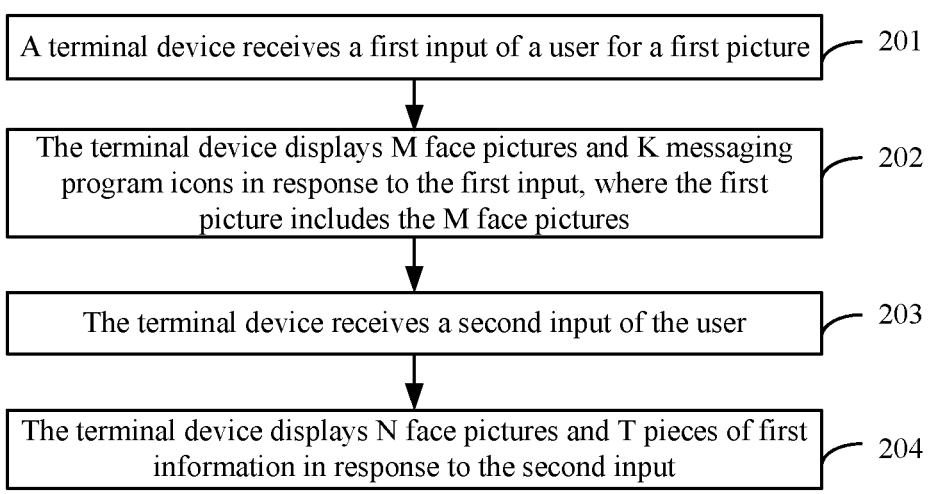
FIG. 2 is a schematic flowchart of an information display method according to an embodiment of the present disclosure.

The information display method of the embodiments of the present disclosure is described below with reference to FIG. 2. FIG. 2 is a schematic flowchart of an information display method according to an embodiment of the present disclosure. As shown in FIG. 2, the information display method includes steps 201 to 204:

Step 201: A terminal device receives a first input that is performed by a user on a first picture.

For the convenience of explanation, assuming that the first picture is displayed on the first interface of the terminal device, the first interface can be an interface on which the terminal device collects the first picture, or can be an interface selected on the terminal device according to other operations of the user to display the first picture. For example, the first interface is an interface for viewing a picture in the album of the terminal, or an interface for viewing a picture in an application that receives a picture, or an interface for viewing a picture on a webpage when browsing the webpage, which is not specifically limited in the embodiments of the present disclosure.

Optionally, the first picture may be a preview picture on a shooting interface of the terminal, or a picture that has been collected by the terminal, or a picture obtained through the network, which is not specifically limited in the embodiments of the present disclosure.

It is understandable that one or more face pictures may be included in the first picture, which is not specifically limited in the embodiments of the present disclosure.

Figure 3:
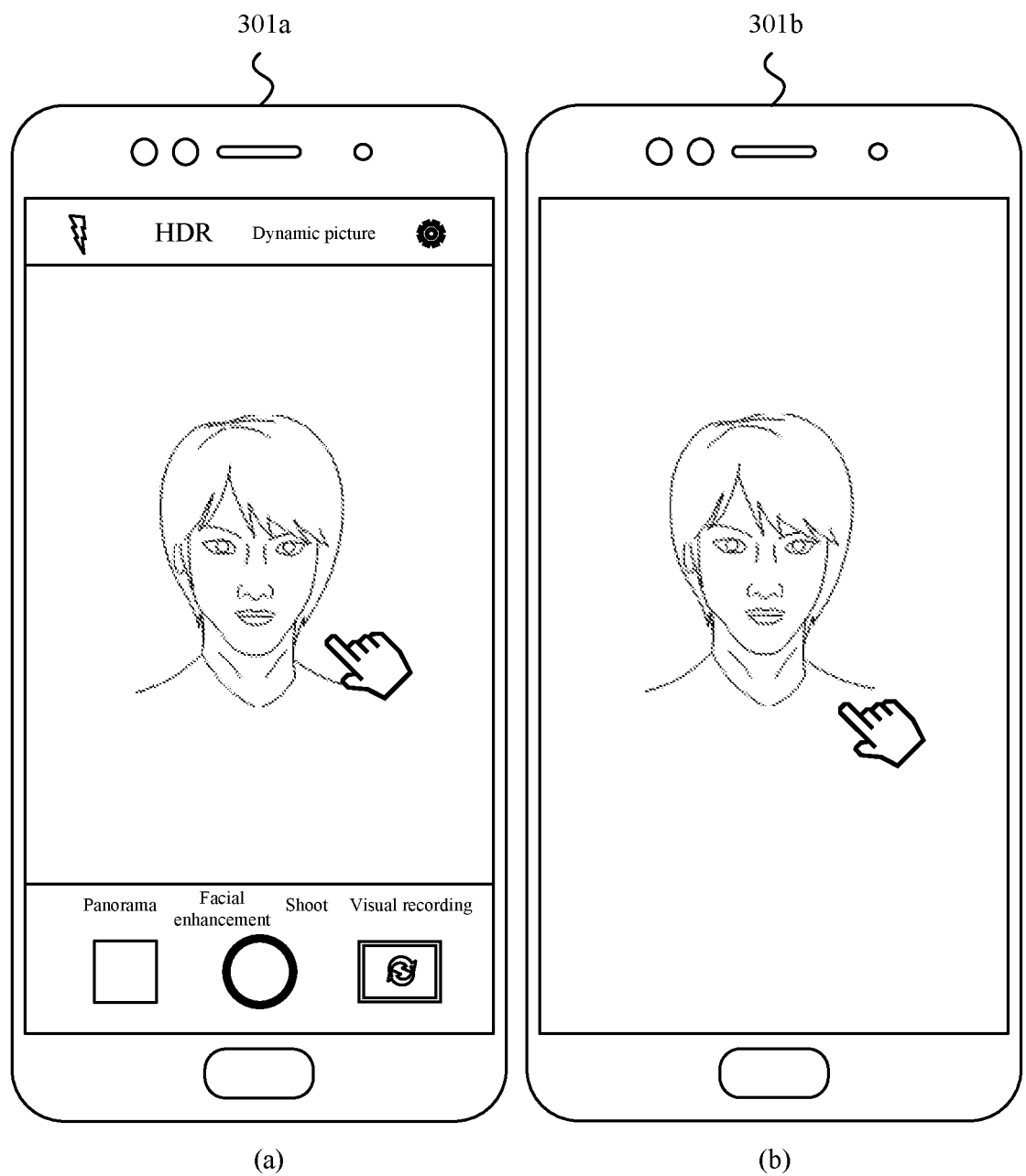
FIG. 3 is a first schematic diagram of a display interface according to an embodiment of the present disclosure.

For example, FIG. 3 is a schematic diagram of a display interface according to an embodiment of the present disclosure. The first interface can be an interface 301a shown in (a) in FIG. 3 or an interface 301b shown in (b) in FIG. 3. The interface 301a is a shooting preview interface of the camera of the terminal device, the interface 301b is a display interface for picture display on the terminal device, and the first picture on the interface 301a and the first picture on the interface 301b both include a face picture. When multiple pictures are included in the first picture, with reference to the interface 301a, the first interface further can be an interface 302a shown in (a) in FIG. 4; with reference to the interface 301b, the first interface further can be an interface 302b shown in (b) in FIG. 4.

Optionally, the first interface further can display a "search people through face" or "search people" control, which can be displayed in an adjacent area of another control on the shooting interface (for example, may be displayed in the right area of "recording" on the interface 301a), or after the user selects the first picture, it can be displayed in an adjacent area of another control. In this case, the first input can be an input on the "search people through face" or "search people" control.

Certainly, the first interface may not need to display the "search people through face" or "search people" control, and the "search people through face" function can be activated by receiving the user's shortcut input (for example, long press on the screen), which is not specifically limited in the embodiments of the present disclosure.

Optionally, the first input can be a touch screen input, a fingerprint input, a gravity input, a key input, or the like. The touch screen input is a pressing input, a long pressing input, a sliding input, a tap input, a floating input (the user's input near the touch screen), and the like of a user on the terminal's touch screen. The fingerprint input is a swipe fingerprint input, a long-press fingerprint input, a single-click fingerprint input, and a double-click fingerprint input of a user on the terminal's fingerprint reader. The gravity input is an input of shaking a terminal in a specific direction by a user, shaking for a specific quantity of times, or the like. The key input corresponds to the user's single-click input, double-click input, long-press input, combined key input, or the like on the terminal's power key, volume key, home key, or the like. The embodiments of the present disclosure do not specifically limit the form of the first input, which may be any achievable form.

It should be noted that, in the embodiments of the present disclosure, the first input may be a continuous input, or may include multiple discontinuous inputs, which is not specifically limited in the embodiments of the present disclosure.

Step 202: The terminal device displays M face pictures and icons of K messaging programs in response to the first input, where the first picture includes the M face pictures.

Both M and K are positive integers.

For ease of explanation, it is assumed that the terminal device displays the M face pictures and the icons of the K messaging programs on the second interface. Specifically, the terminal device can update display of the first interface to display of the second interface in response to the first input, where the second interface includes the M face pictures and the icons of the K applications, and the M face pictures are face pictures in the first picture.

Figure 5:
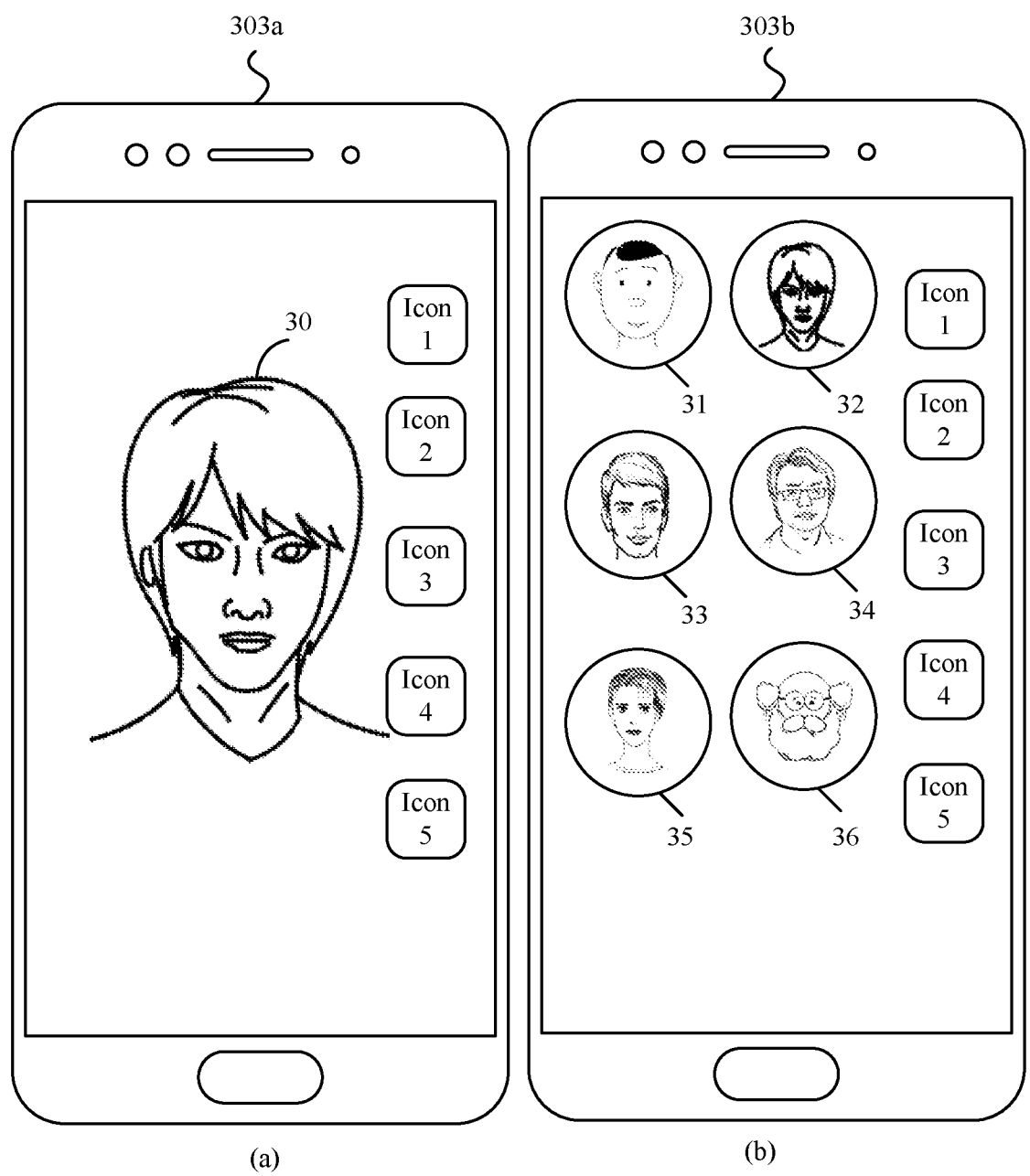
FIG. 5 is a third schematic diagram of a display interface according to an embodiment of the present disclosure.

For example, FIG. 5 is a schematic diagram of a display interface according to an embodiment of the present disclosure. When one face picture is included in the first picture, the second interface can be an interface 303a shown in (a) in FIG. 5; when multiple face pictures are included in the first picture, the second interface further can be an interface 303b shown in (b) in FIG. 5. The interface 303a includes 1 face picture and icons of 5 applications: a face picture 30, an icon 1 of a messaging program 1, an icon 2 of a messaging program 2, an icon 3 of a messaging program 3, an icon 4 of a messaging program 4, and an icon 5 of a messaging program 5. The interface 303b includes 6 face pictures and 5 messaging program icons: a face picture 31, a face picture 32, a face picture 33, a face picture 34, a face picture 35, a face picture 36, an icon 1, an icon 2, an icon 3, an icon 4, and an icon 5.

Step 203: The terminal device receives a second input that is performed by the user.

It can be understood that the second input can be an input performed by the user to determine to select the N face pictures and select a messaging program.

It should be noted that, the second input may be a continuous input, or may be an input including multiple discontinuous inputs, which is not specifically limited in the embodiments of the present disclosure.

Specifically, the second input can be the user's input on the second interface. The terminal device can receive the second input used by the user to determine to select the N face pictures and select the messaging program on the second interface.

Figure 6:
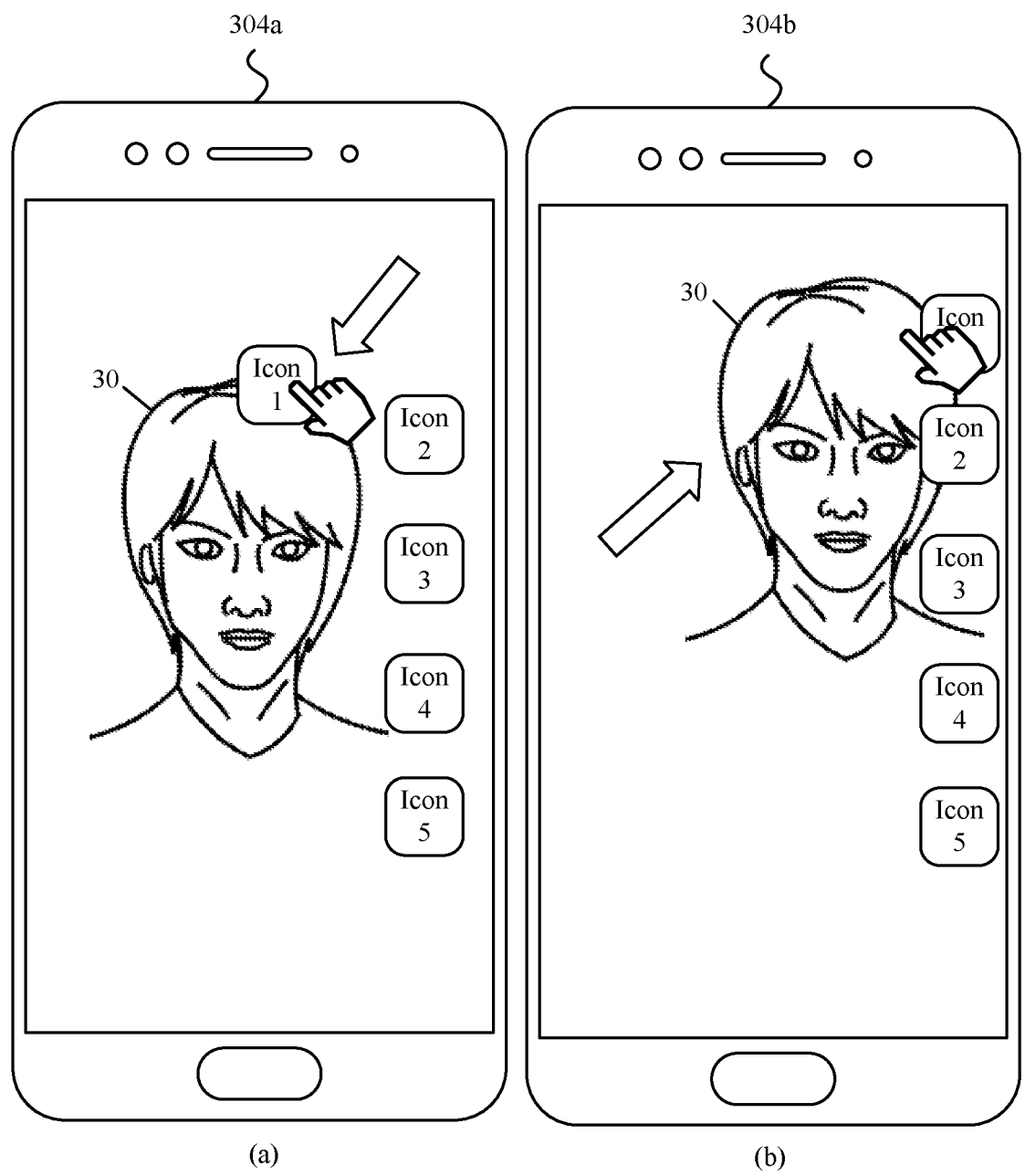
FIG. 6 is a fourth schematic diagram of a display interface according to an embodiment of the present disclosure.

For example, FIG. 6 is a schematic diagram of an interface according to an embodiment of the present disclosure. With reference to the interface 303a, the second input can be an input that the user moves the icon 1 on the interface 303a to the area of the face picture 30, that is, an input on the interface 304a shown in (a) in FIG. 6; and the second input can also be an input that the user drags the face picture 30 on the interface 303a to the area of the icon 1, that is, an input on the interface 304b shown in (b) in FIG. 6.

Specifically, the second input on the interface 304b shown in (b) in FIG. 6 can be an input that the user drags the face picture 30 to the icon 1 and stays on the icon 1 for a preset length of time (for example, 2 seconds).

Step 204: The terminal device displays N face pictures and T pieces of first information in response to the second input.

The N face pictures are face pictures that are of the M face pictures and that correspond to the second input, each piece of first information corresponds to at least one face picture, one piece of first information is information of a user indicated by at least one face picture corresponding to the first information, each piece of first information includes information in at least one first messaging program of the K messaging programs, N and T are both positive integers, and N is less than or equal to M.

It should be noted that the first messaging program is a messaging program corresponding to the second input, and can be one messaging program selected by the user, or multiple messaging programs selected by the user, which is not specifically limited in the embodiments of the present disclosure.

It should be noted that when the first information corresponds to face pictures, T can be equal to N, and when the first information corresponds to information types, T may not be equal to N.

For ease of explanation, for example, the terminal device displays N face pictures and T pieces of first information on the third interface. Specifically, the terminal device can update display of the second interface to display of the third interface in response to the second input, where the third interface includes the N face pictures and the T pieces of first information.

Figure 7:
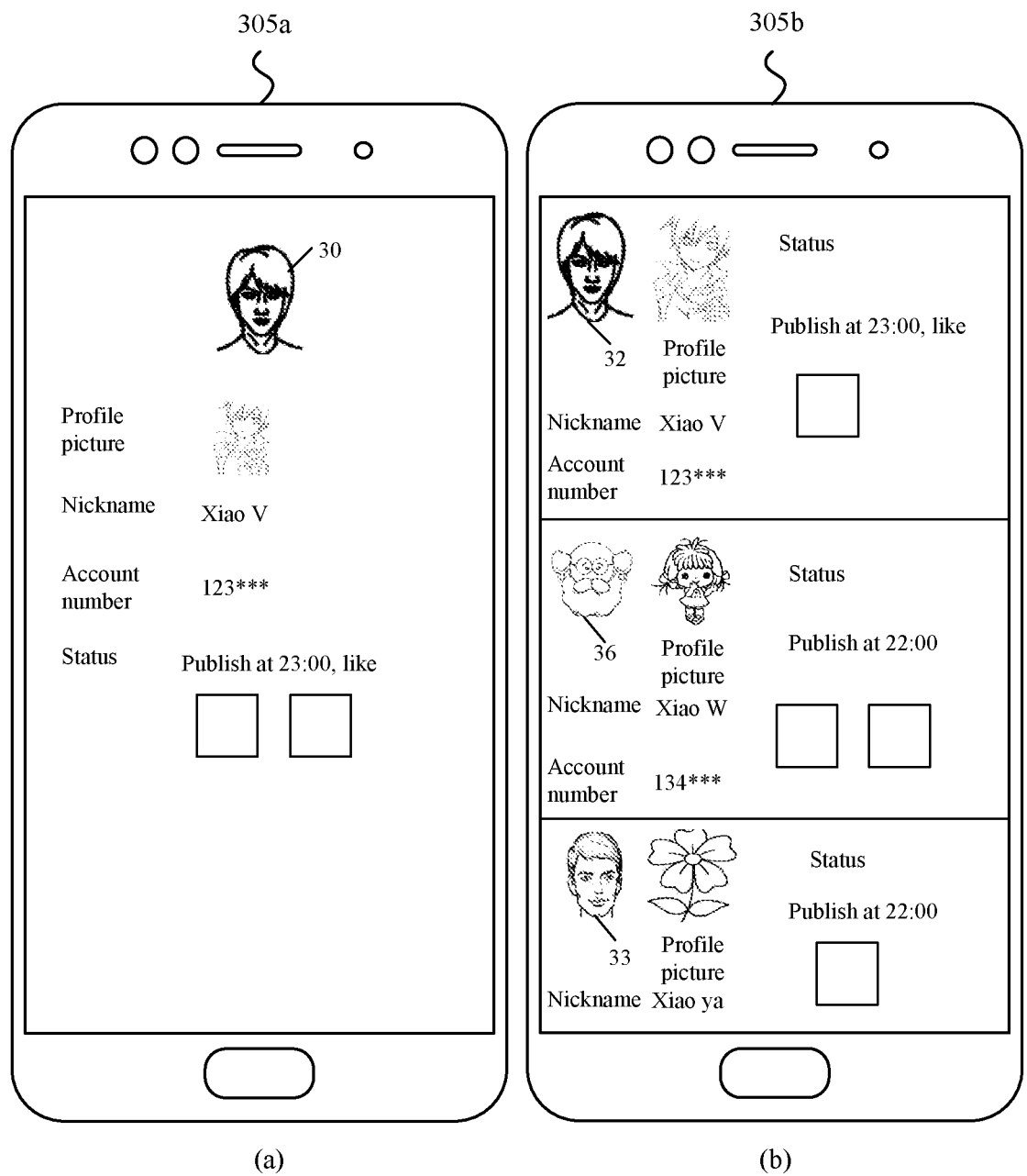
FIG. 7 is a fifth schematic diagram of a display interface according to an embodiment of the present disclosure.

For example, FIG. 7 is a schematic diagram of a display interface according to an embodiment of the present disclosure. When the interface 303a is the second interface, the third interface can be an interface 305a as shown in (a) in FIG. 7. The interface 305a displays the face picture 30 and user information corresponding to the face picture 30 in the messaging program 1 (for example, a profile picture, a nickname, an account number, and a status). When the interface 303b is the second interface, assuming that the second input selects a face picture 32, a face picture 36, a face picture 33, and the icon 1 of the messaging program 1, the third interface can be an interface 305b shown in (b) in FIG. 7. The interface 305b displays the face picture 32, user information corresponding to the face picture 32 in the messaging program 1, the face picture 36, user information corresponding to the face picture 36 in the messaging program 1, the face picture 33, and user information corresponding to the face picture 33 in the messaging program 1. User information corresponding to each face picture can be the first information.

It is understandable that if the user selects all face pictures and one icon on the interface 303b, the third interface can be the interface shown on the interface 305b, and the user can slide up and down on the interface 305b and then view user information of each face picture in a messaging program corresponding to the icon.

In the information display method in the embodiments of the present disclosure, first, the terminal device receives a first input that is performed by a user on a first picture; and then displays M face pictures and icons of K messaging programs in response to the first input, where the first picture includes the M face pictures. Further, the terminal device receives a second input that is performed by the user. Finally, the terminal device displays N face pictures and T pieces of first information in response to the second input. One piece of first information is information of a user indicated by at least one face picture corresponding to the first information, and each piece of first information includes information in at least one first messaging program of the K messaging programs. Because the terminal device can display, based on a face picture in a picture, information of a user in a messaging program corresponding to the face picture, a user can quickly determine, according to the information of the user displayed on the terminal device, whether the user is a contact that the user needs to search for, and there is no need to manually search a large amount of information. Therefore, in the information display method provided in the embodiments of the present disclosure, query is fast and accuracy of the query result is high.

In a possible implementation, before display of the first interface is updated to display of the second interface, the information display method provided in the embodiments of the present disclosure further includes step 205 and step 206:

Step 205: The terminal device displays a query control in response to the first input.

Specifically, the terminal device can display the query control on the first interface.

Figure 8:
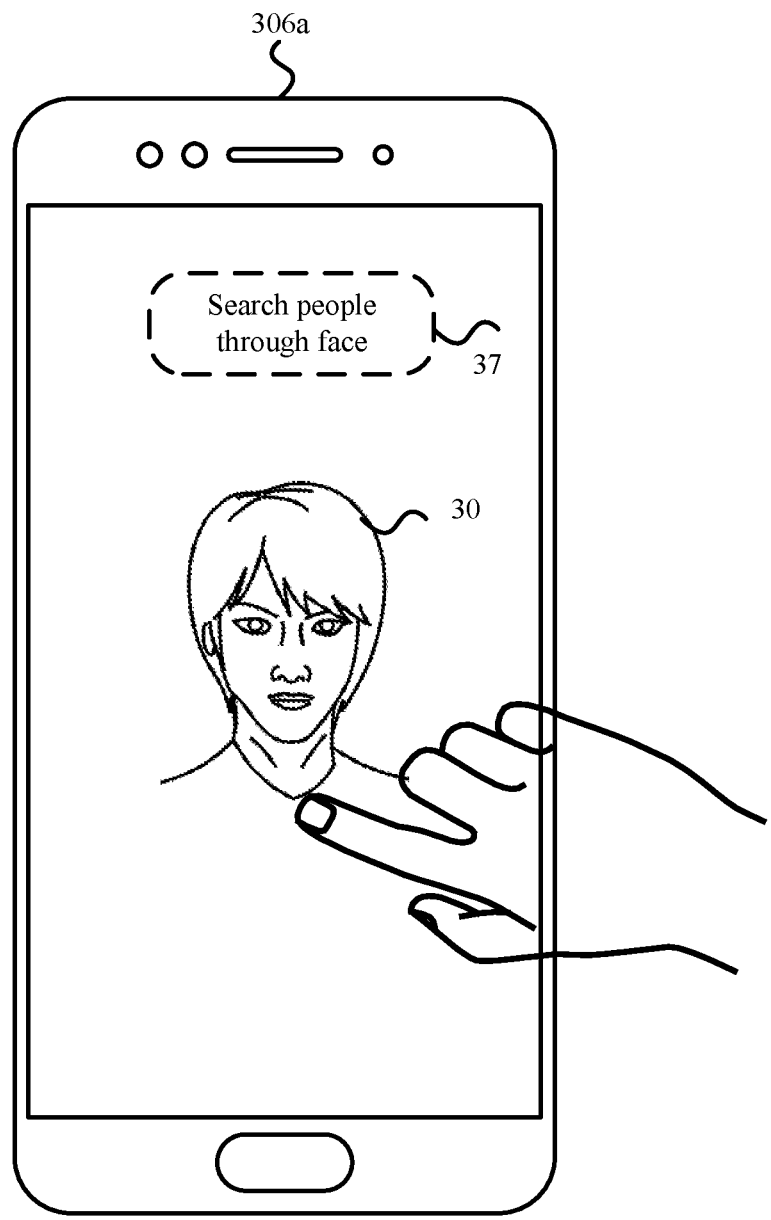
FIG. 8 is a sixth schematic diagram of a display interface according to an embodiment of the present disclosure.

For example, with reference to the interface 301b shown in (b) in FIG. 3, as shown in FIG. 8, the terminal device displays the query control 37 on the interface 306a. Specifically, the first input can be an input that the user long presses the screen. For example, after the user long presses the area of the face picture on the screen for 0.5S to 1S, the terminal device displays the query control 37 in FIG. 8 in another area that does not display a face picture on the interface, and the query control 37 can display words "search people through face".

Figure 4:
FIG. 4 is a second schematic diagram of a display interface according to an embodiment of the present disclosure.
Figure 9:
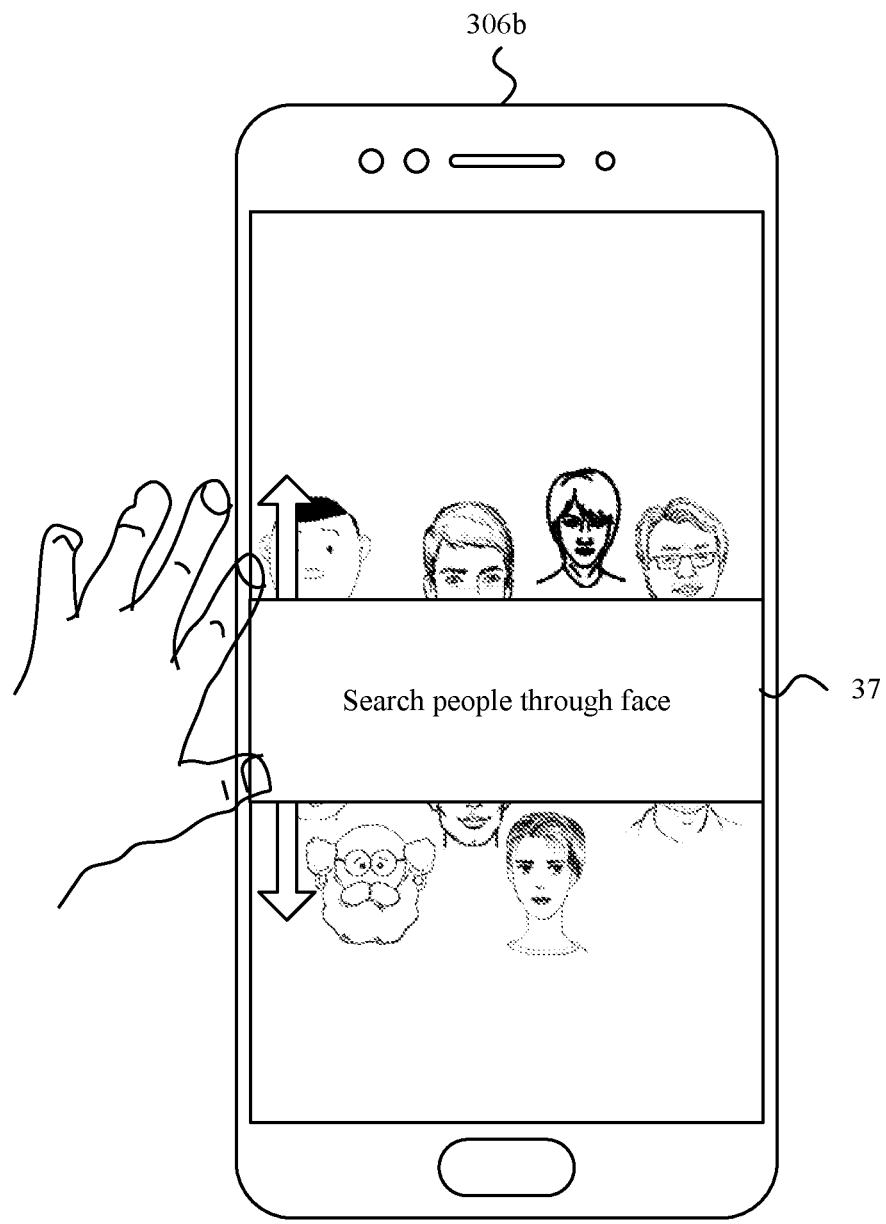
FIG. 9 is a seventh schematic diagram of a display interface according to an embodiment of the present disclosure.

Alternatively, with reference to the interface 302b shown in (b) in FIG. 4, as shown in FIG. 9, the terminal device can display the query control 37 on the interface 306b. Optionally, the first input can be that two fingers of the user respectively slide in two directions, for example, in two directions shown in FIG. 9, where the thumb slides down and the index finger slides up. After the terminal device receives the first input, the terminal device can display the query control 37 on the interface, and the query control 37 can display words "search people through face". Specifically, the terminal device can also cut the first picture from the middle and move one part upward and the other part downward, and the query control 37 is displayed between the two parts.

It is understandable that the interface is only an exemplary description. In practical applications, words displayed on the query control, the shape of the query control, and the display position of the query control can be set as needed, and the position of the query control can be any position on the first interface, which is not specifically limited in the embodiments of the present disclosure.

Step 206: The terminal device receives an input that is performed by the user on the query control.

Optionally, the input that is performed by the user on the query control can be only a selection input for the query control, or can be an input for the face picture and the query control. For example, on the interface 306a in FIG. 8, the query control 37 can be clicked or pressed, and on the interface 306b in FIG. 9, the query control 37 can be clicked or pressed. In this case, the user can select to query user information corresponding to all face pictures in the first picture by default. Certainly, the input that is performed by the user on the query control is the input for the face picture and the query control. For example, on the interface 306a in FIG. 8, the user can drag the face picture to the area of the query control 37, which is not specifically limited in the embodiments of the present disclosure.

Furthermore, step 202 can be specifically implemented through step 202a.

Step 202a: The terminal device displays N face pictures and T pieces of first information in response to the input for the query control.

Specifically, the terminal device can update display of the first interface to display of the second interface in response to the input for the query control on the first interface.

Figure 10:
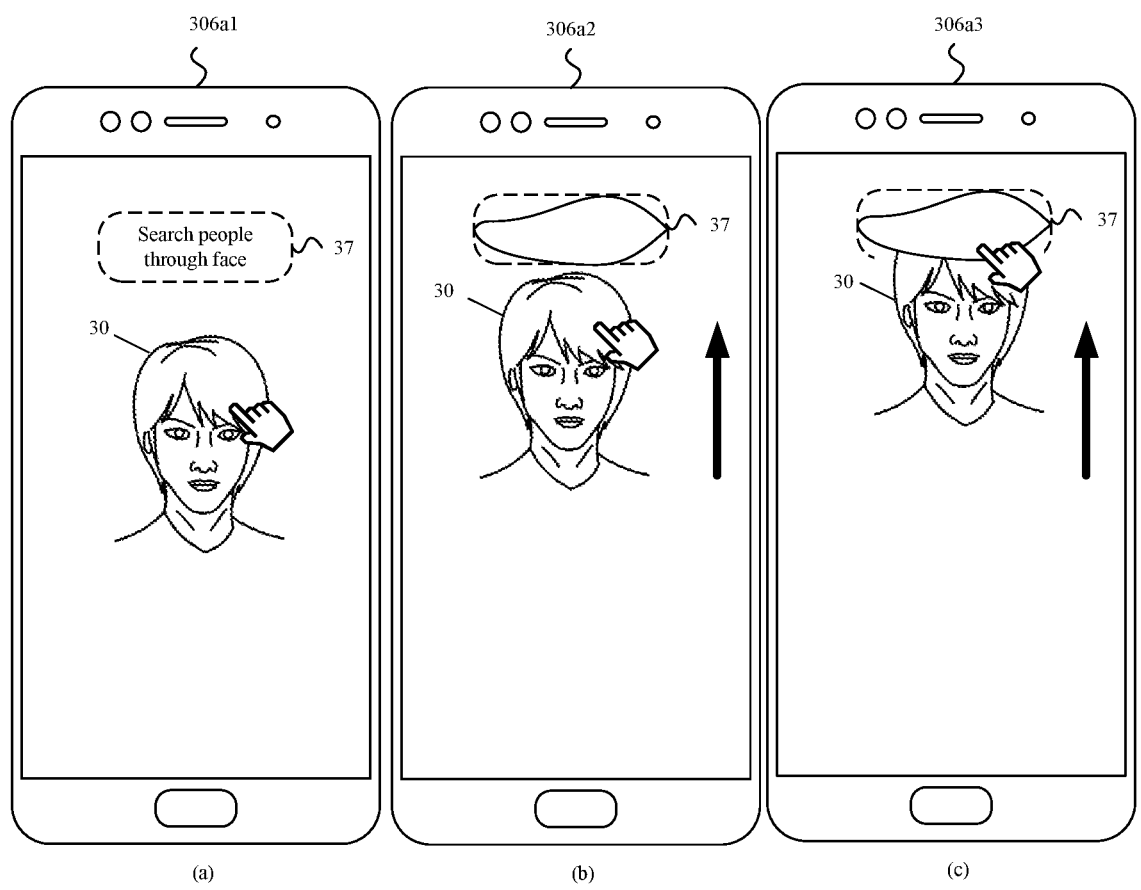
FIG. 10 is an eighth schematic diagram of a display interface according to an embodiment of the present disclosure.

For example, assuming that the input for the query control is an input of dragging the face picture to the icon of the messaging program, with reference to the interface 304a shown in (a) in FIG. 6, the user can select the face picture 30 on the interface 304a, and then drag the face picture 30 to the area of the query control 37. During the process of dragging the face picture 30, corresponding interfaces can be displayed as follows: an interface 306a1 shown in (a) in FIG. 10, an interface 306a2 shown in (b) in FIG. 10, and an interface 306a3 shown in (c) in FIG. 10. After the user completes the movement and releases the finger, the interface 303a (that is, the second interface) shown in (a) in FIG. 5 can be displayed.

Specifically, after the user selects the face picture, the terminal can cancel display of words "search people through face" displayed in the query control 37, and display a hole-shaped area in the query control 37, as shown on the interface 306a2. When the user moves the face picture to the area of the query control 37, the face picture is not displayed in the hole-shaped area, and the entire face picture disappears after the user moves the entire face picture to the hole-shaped area. After the user moves all selected face pictures to the hole-shaped area, the terminal device can display the second interface, such as the interface 303a or the interface 303b shown in FIG. 5.

Based on this solution, the terminal device can display the query control for the user to select and operate, and the user can select the "search people through face" function through the query control, and then query a user corresponding to a face picture that needs to be queried.

In a possible implementation, step 204 can be implemented through step 204a1.

Step 204a1: The terminal device displays the icons of the K messaging programs, the N face pictures, and the T pieces of first information in response to the second input.

Specifically, the terminal device can update display of the second interface to display of the third interface in response to the second input, where the third interface includes the icons of the K applications, the N face pictures, and the T pieces of first information.

Optionally, the third interface also includes the icons of the K messaging programs. With reference to the interface 305a, as shown in (a) in FIG. 11, the third interface further can be an interface 305a1; as shown in (b) in FIG. 11, the third interface further can be an interface 305a2. On the interface 305a1, the icons of the K messaging programs are directly displayed on the side of the user information, and on the interface 305a2, the icons of the K messaging programs are displayed on a sub-interface 38.

Figure 11:
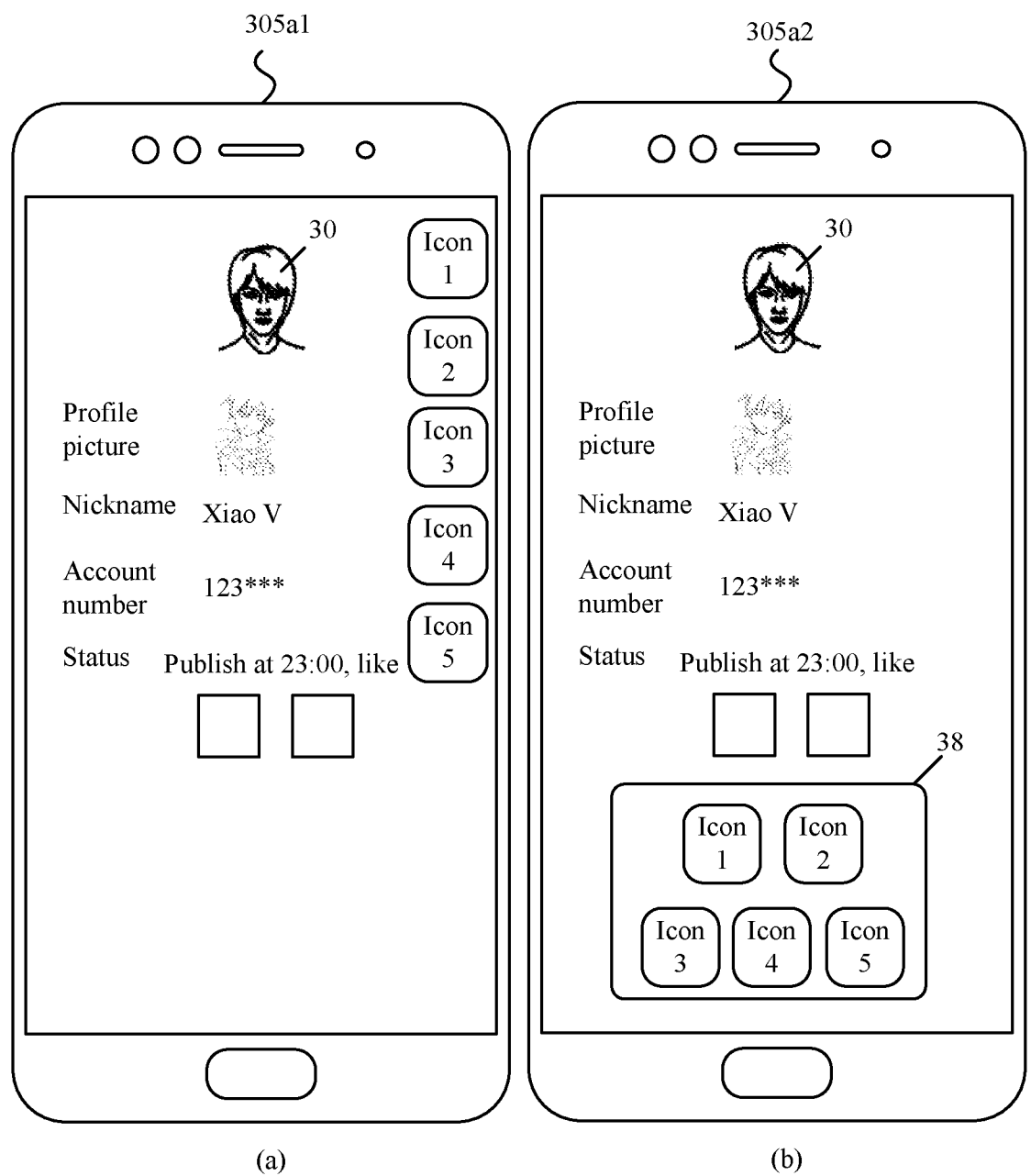
FIG. 11 is a ninth schematic diagram of a display interface according to an embodiment of the present disclosure.
Figure 12:
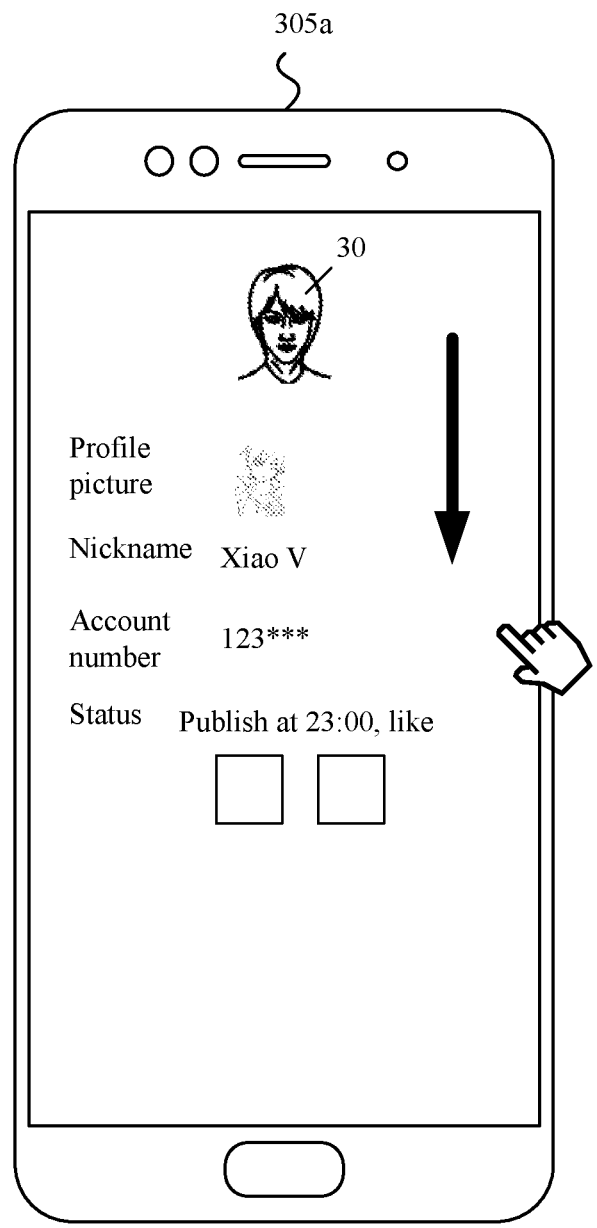
FIG. 12 is a tenth schematic diagram of a display interface according to an embodiment of the present disclosure.

It should be noted that when the interface 305a is the third interface (that is, the icons of the K messaging programs are not displayed on the third interface), as shown in FIG. 12, the user can enter a shortcut gesture on the interface 305a (for example, slide from top to bottom on the display screen), and then the terminal device updates the third interface, where the updated third interface can be the interface 305a1 or the interface 305a2 in FIG. 11. On the interface 305a2, when display of the sub-interface 38 is additionally triggered by the user on the terminal device, the sub-interface 38 can be displayed in any area on the interface 305a of the terminal device.

Further, after step 204a1, the information display method provided in the embodiments of the present disclosure further includes step 207 and step 208:

Step 207: The terminal device receives a third input that is performed by the user.

Optionally, the third input can be an input that the user clicks on an icon of one of the K messaging programs, or an input that the user drags a face picture to an icon, which is not specifically limited in the embodiments of the present disclosure.

Step 208: The terminal device displays R pieces of second information in response to the third input.

For ease of description, the third input may be the user's input on the third interface. The terminal device can update display of the third interface to display of the fourth interface in response to the third input, where the fourth interface includes the R pieces of second information.

Optionally, the fourth interface can also include the N face pictures and the icons of the K messaging programs.

Each face picture corresponds to one piece of second information, each piece of second information is information of a user indicated by one face picture, each piece of second information includes information in at least one second messaging program, the at least one second messaging program is a messaging program of the K messaging programs other than the at least one first messaging program, and R is a positive integer.

It is understandable that the second messaging program is a messaging program corresponding to the third input, and the third input can correspond to one messaging program or multiple messaging programs, which is not specifically limited in the embodiments of the present disclosure.

Based on this solution, the terminal device can display, based on the third input that is performed by the user, only the user information in the messaging program corresponding to the third input, so that after displaying the first information according to the first input, the user can continue to query the user information corresponding to the face picture according to another application.

In a possible implementation, in step 208, each face picture corresponds to one piece of second information, each piece of second information is information of a user indicated by one face picture, each piece of second information includes information in at least one first messaging program and information in at least one second messaging program, the at least one second messaging program is a messaging program of the K messaging programs other than the at least one first messaging program, and R is a positive integer.

It should be noted that in this solution, the second information may include the content of the first information.

Figure 13:
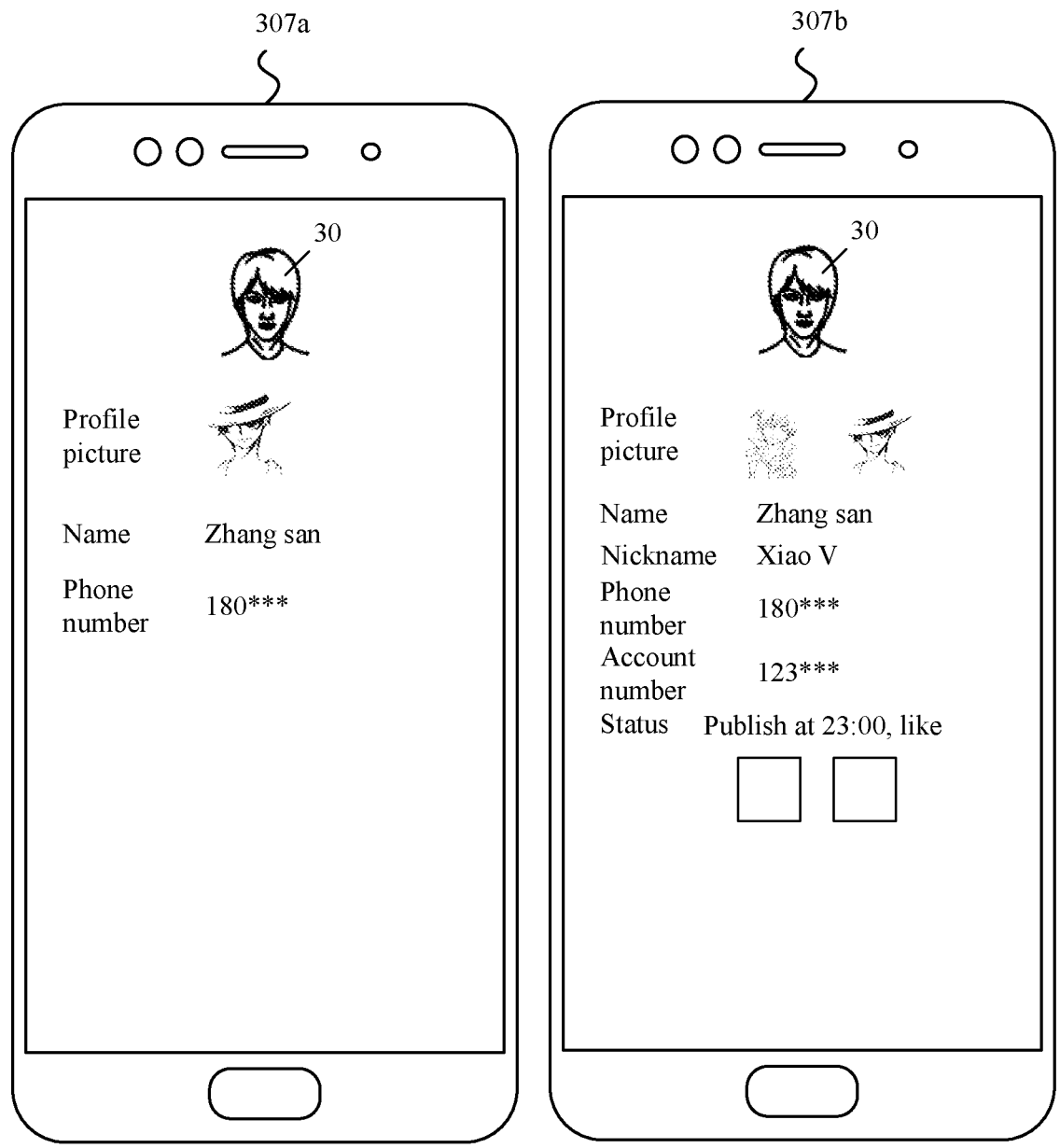
FIG. 13 is an eleventh schematic diagram of a display interface according to an embodiment of the present disclosure.

For example, FIG. 13 is a schematic diagram of a display interface according to an embodiment of the present disclosure. After the terminal device receives the user's third input on the third interface (for example, the interface 305a, the interface 305a1, or the interface 305a2), the terminal device may update the third interface to the interface 307a shown in (a) in FIG. 13 or the interface 307b shown in (b) in FIG. 13. The interface 307a includes the face picture 30 and user information corresponding to the face picture 30 in the messaging program 2. The interface 307b includes the face picture 30, user information corresponding to the face picture 30 in the messaging program 1, and user information corresponding to the face picture 30 in the messaging program 2.

It should be noted that, on the interface 307b, the terminal device combines and displays the user information corresponding to the face picture 30 in two different messaging programs. Certainly, the terminal device can also display information in different messaging programs in different areas according to the different messaging programs, which is not specifically limited in the embodiment of the present disclosure.

It should be noted that if the third interface is the interface 305a1 or the interface 305a2, the updated third interface displayed by the terminal device after receiving the third input from the user may also include the icons of the K messaging programs, which is not specifically limited in the embodiment of the present disclosure.

Based on this solution, the terminal device can display the information in the at least one second messaging program and the information in the at least one first messaging program according to the third input that is performed by the user, and the user can obtain user information in different applications as needed, so that the user can make more accurate judgments based on the information displayed on the terminal.

Optionally, in the information display method provided by the embodiments of the present disclosure, step 208 may also be performed through step 208a:

Step 208a: The terminal device displays N pieces of first information in a first area and displays R pieces of second information in a second area in response to the third input.

Each piece of second information includes information in the at least one second messaging program.

Based on this solution, the terminal device can display different user information in different areas, so that it is convenient for the user to compare and view the user information in different areas.

In a possible implementation, each piece of first information includes the first type of information in at least one first messaging program of the K messaging programs. Step 208 in the information display method provided by the embodiments of the present disclosure can also be performed through step 208b:

Step 208b: The terminal device displays the T pieces of first information and H pieces of third information in response to the third input.

Each face picture corresponds to one piece of third information, each piece of third information is information of a user indicated by one face picture, each piece of third information includes information in at least one first messaging program, each piece of third information includes second type of information in the at least one first messaging program of the K messaging programs, and H is a positive integer.

For example, the first type of information may be a user name and a profile picture, and the second type of information may be the user's occupation.

Based on this solution, the terminal device can display different types of user information at different times according to different inputs of the user. In response to the first input, the terminal device can display T pieces of first information, and in response to the third input, display T pieces of first information and H pieces of second information. After the first type of information is displayed by the terminal, the user can continue to query the second type of information, so that the user queries information in more flexible and diverse manners.

Optionally, the second input includes a first sub-input and a second sub-input.

In a possible implementation, in the information display method provided in the embodiments of the present disclosure, step 204 may specifically include step 204a and step 204b:

Step 204a: When a target interface displays the M face pictures and the icons of the K messaging programs, the terminal device displays a sub-interface including the T pieces of first information on the target interface in response to the first sub-input.

Optionally, the sub-interface can be displayed on the target interface based on preset transparency.

Specifically, the target interface may be the second interface in the foregoing embodiment.

Figure 14:
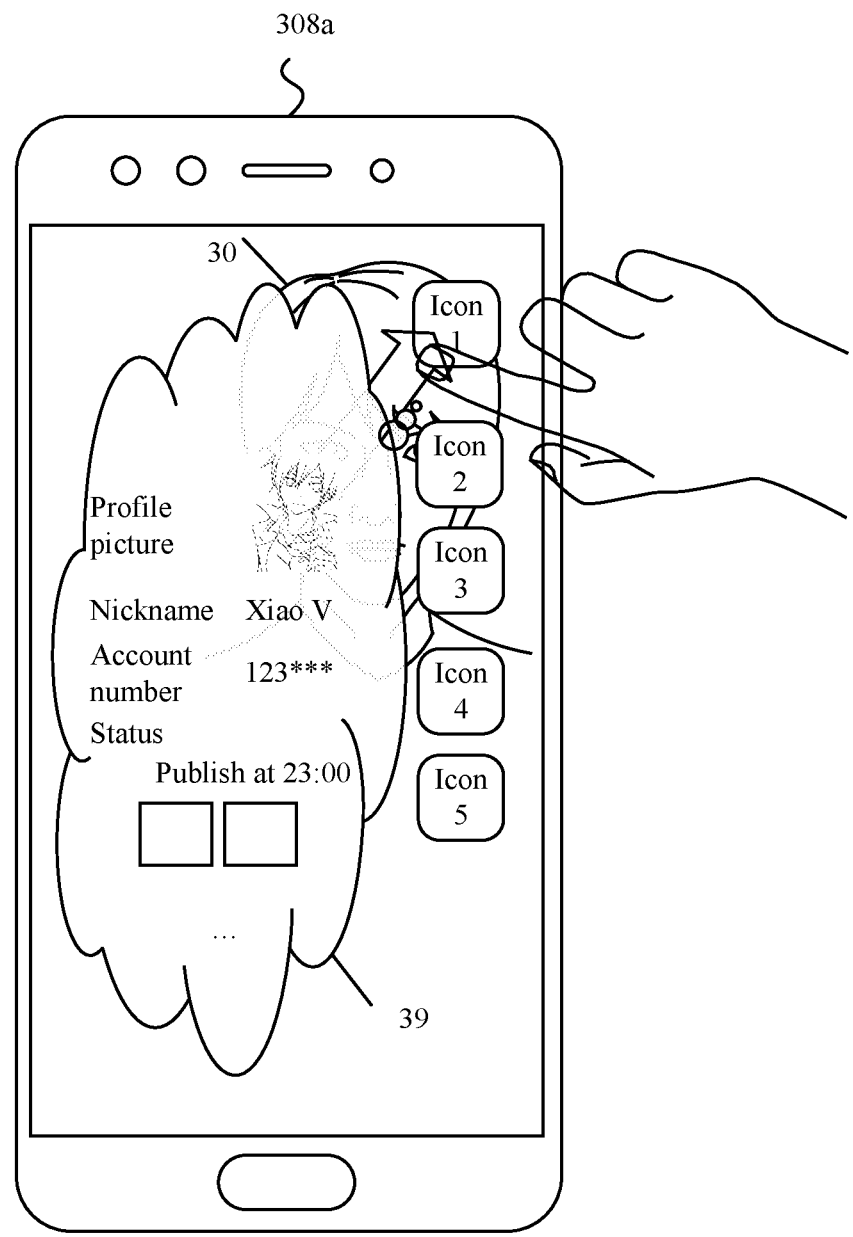
FIG. 14 is a twelfth schematic diagram of a display interface according to an embodiment of the present disclosure.

For example, with reference to the interface 303a shown in (a) in FIG. 5 and the interface 308a shown in FIG. 14, the terminal device displays a sub-interface 39 on the interface 303a, where the sub-interface 39 includes user information corresponding to the face picture 30 in the messaging program 1.

It is understandable that if the second interface is the interface shown in interface 303b, when the first sub-input is an input of selecting multiple face pictures and dragging the multiple face pictures to the icon 2, the sub-interface 39 may include user information corresponding to the multiple face pictures selected by the first sub-input in the messaging program 2.

Step 204b: The terminal device updates display of the target interface and the sub-interface to display of an interface including the N face pictures and the T pieces of first information in response to the second sub-input.

For example, with reference to FIG. 14, after the terminal displays the sub-interface 39 on the interface 303a, assuming that the user has no other operations or drags the face picture 30 to another position and then drags it back to the icon 2, after the user releases the finger in the area of the icon 2, the terminal device can display the interface 305a (that is, the third interface) shown in (a) in FIG. 5.

Based on this solution, the terminal device can first display a sub-interface according to the user's input, where the first information can be displayed on the sub-interface in advance, and the user can determine, based on the first information displayed on the sub-interface, whether the user is a user that the user searches for.

Optionally, the first sub-input is an input for dragging the N face pictures to an icon of a target messaging program, the target messaging program is a messaging program of the at least one first messaging program, and each piece of first information is information in the target messaging program. When different first sub-inputs correspond to different target messaging programs, each piece of first information is information in different target messaging programs.

Figure 15:
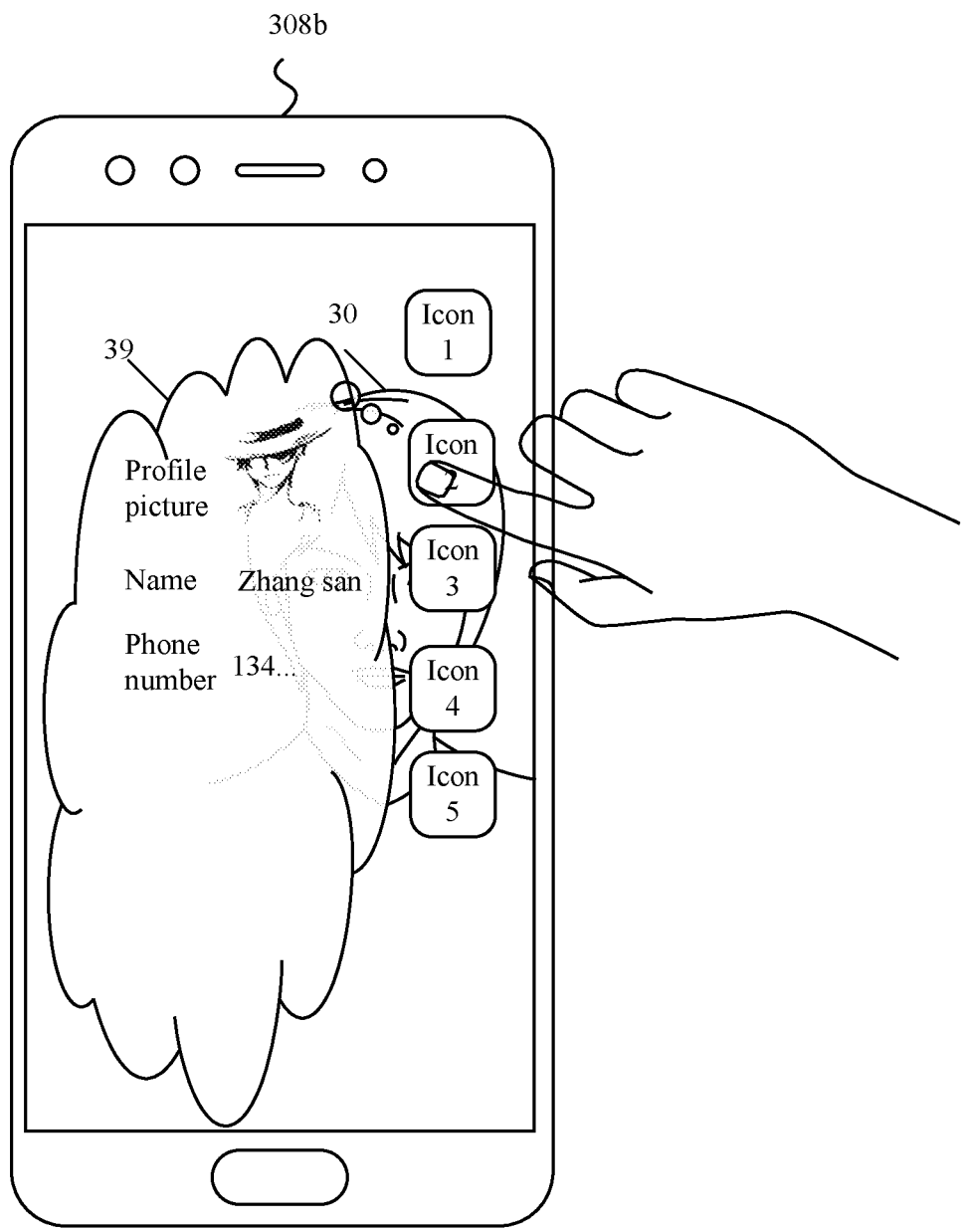
FIG. 15 is a thirteenth schematic diagram of a display interface according to an embodiment of the present disclosure.

For example, FIG. 15 is a schematic diagram of a display interface according to an embodiment of the present disclosure. With reference to FIG. 14, after the user selects the face picture 30, the user moves the face picture 30 to the icon 2, and the terminal device can display the interface 308b and the sub-interface 39 shown in FIG. 15. In this case, information displayed on the sub-interface 39 is user information corresponding to the face picture 30 in the messaging program 2.

Based on this solution, when the user drags the N face pictures to an icon of a messaging program, the terminal device can display the first information of the N face pictures corresponding to the messaging program on the sub-interface. When the user drags the N face pictures to an icon of another messaging program, the terminal device can display the first information of the N face picture corresponding to the another messaging program on the sub-interface. In this way, the user can flexibly view user information corresponding to the N face pictures in different messaging programs.

Optionally, the target first information includes P profile pictures, each profile picture is a profile picture in a first messaging program corresponding to the target first information, and the target first information is information of the N pieces of first information.

In a possible implementation, the information display method provided in the embodiment of the present disclosure further includes step 209 and step 210 after step 204:

Step 209: The terminal device receives a fourth input that is performed by the user.

Specifically, the terminal device may receive the user's fourth input on the third interface.

Optionally, the fifth input can be an input that the user moves the selected face picture to the profile picture on the third interface, or an input of moving the selected profile picture to the face picture, or an input of clicking the "profile picture" option, which is not specifically limited in the embodiments of the present disclosure.

Step 210: The terminal device updates Q profile pictures of the P profile pictures to a target face picture in response to the fourth input, where the target face picture is a face picture corresponding to the target first information.

The P profile pictures are profile pictures of a same user in different messaging programs, P and Q are both positive integers, and Q is equal to 1 or Q is equal to P.

It is understandable that the Q profile pictures are profile pictures corresponding to the fourth input, and may be profile pictures in one messaging program selected by the user, or may be multiple profile pictures selected by the user, or can be profile pictures corresponding to a face picture in multiple messaging programs selected by the user, which is not specifically limited in the embodiments of the present disclosure.

It should be noted that the terminal device also updates the user's profile picture in the messaging program of the profile picture to the target face picture, or adds the target face picture to the user's information in the messaging program of the profile picture.

Figure 16:
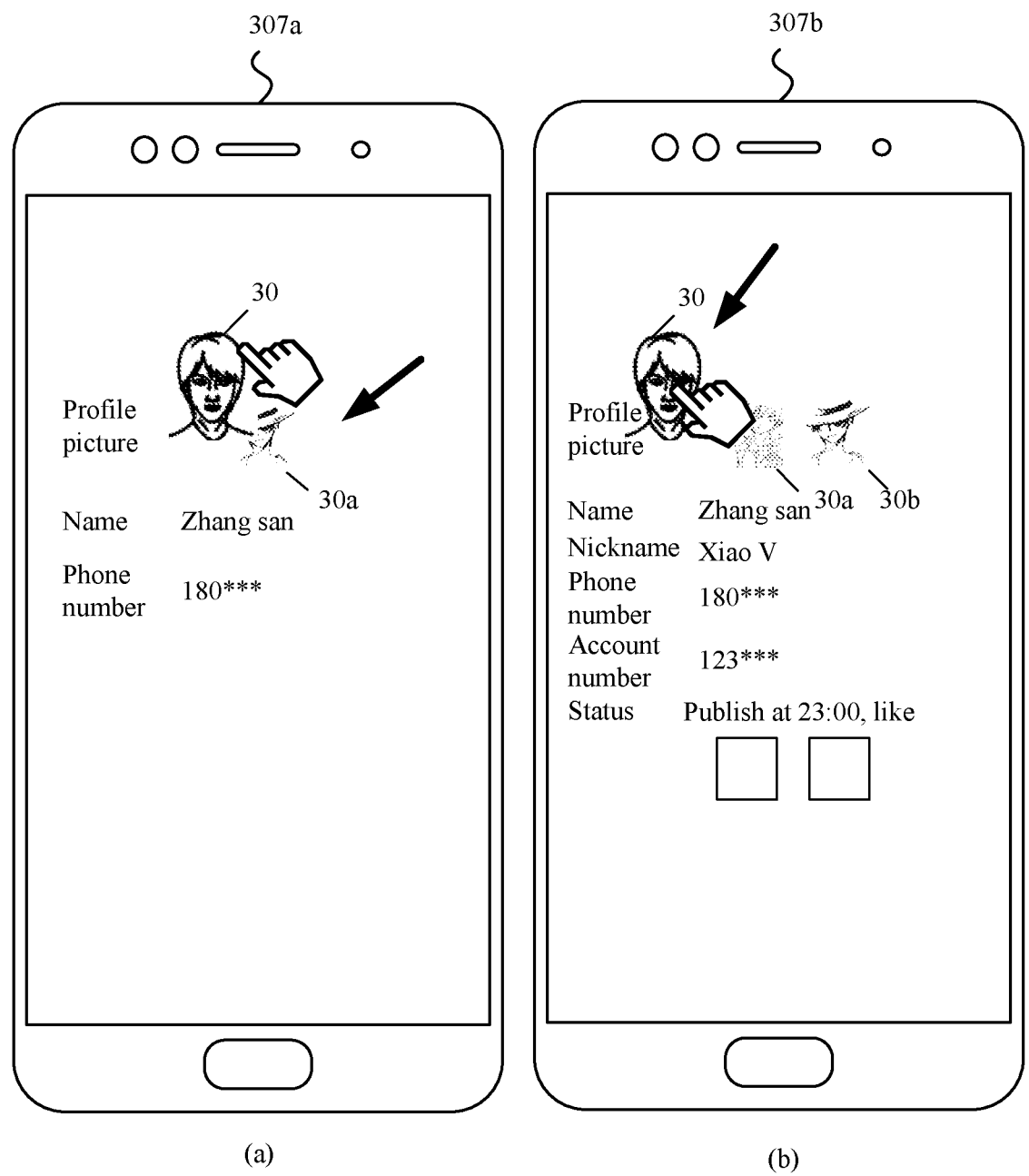
FIG. 16 is a fourteenth schematic diagram of a display interface according to an embodiment of the present disclosure.
Figure 17:
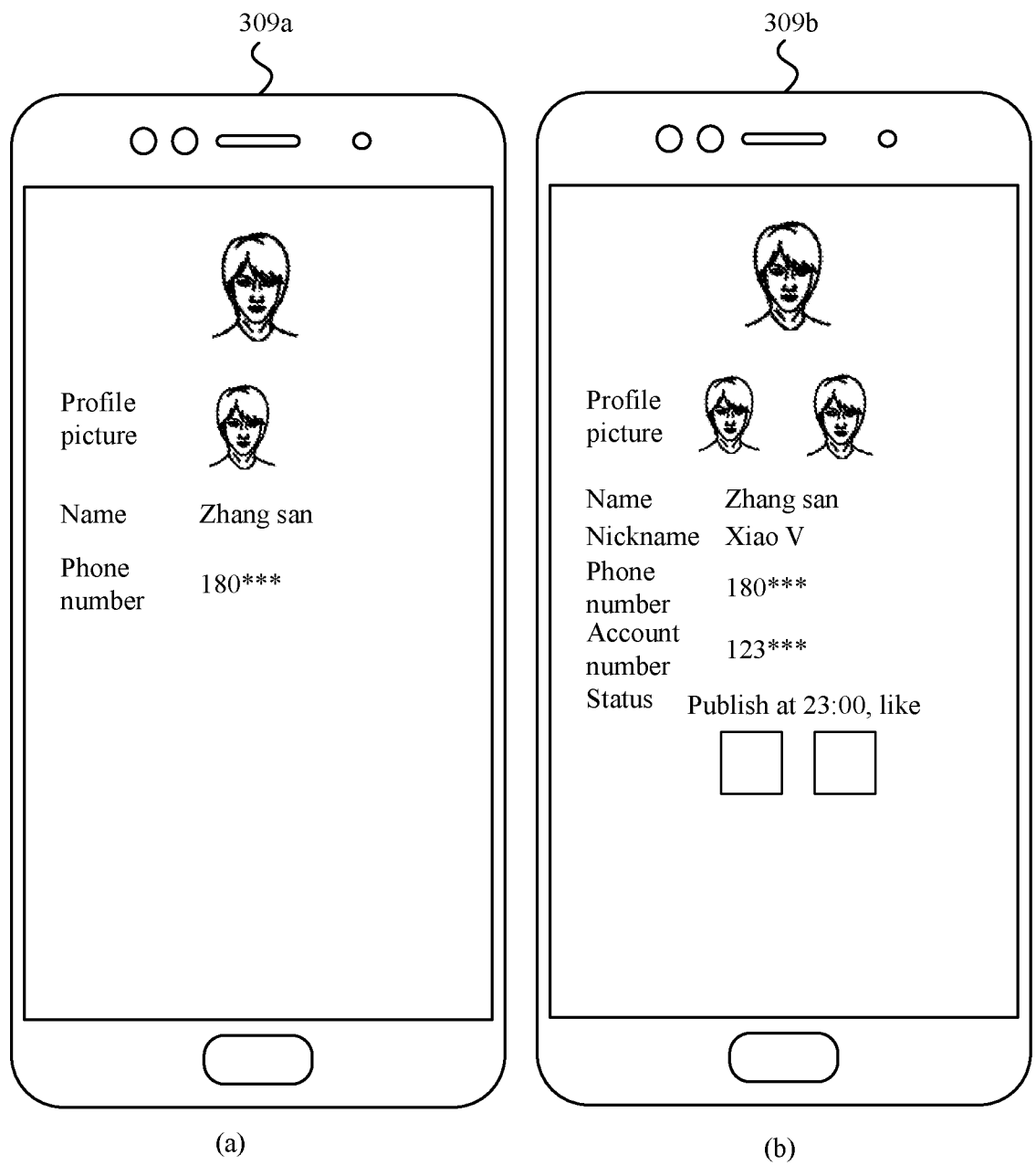
FIG. 17 is a fifteenth schematic diagram of a display interface according to an embodiment of the present disclosure.

For example, with reference to the interface 307a, as shown in (a) in FIG. 16, the user selects the face picture 30 on the interface 307a and moves it to the profile picture 30a, and then as shown on the interface 309a as shown in (a) in FIG. 17, the terminal device updates the profile picture 30a to the face picture 30. With reference to the interface 307b, as shown in (b) in FIG. 16, if the user moves the face picture 30 to the word "picture" or clicks on the word "profile picture" on the interface, as shown on the interface 309b shown in (b) in FIG. 17, the terminal device updates the profile picture 30a and the profile picture 30b to the face picture 30.

Based on this solution, the user can control the terminal device to change the user profile picture in the user information in the messaging program, so that the user can remember the user profile picture and can find the corresponding user more quickly.

Optionally, the third interface further includes at least one classification control, the N face pictures are classified and displayed on the third interface according to the T pieces of first information, and the T pieces of first information correspond to the first classification control of the at least one classification control.

In a possible implementation, in the information display method provided in the embodiments of the present disclosure, step 204 can also be performed through step 204c:

Step 204c: The terminal device displays at least one classification control in response to the second input, and classifies and displays the N face pictures according to the T pieces of first information, where the T pieces of first information correspond to a first classification control of the at least one classification control.

At least two face pictures of the N face pictures correspond to the same first information.

Optionally, the information display method provided by the embodiments of the present disclosure further includes step 211 and step 212 after step 204:

Step 211: The terminal device receives a fifth input that is performed by the user on a second classification control of the at least one classification control.

It should be noted that the classification controls in the embodiments of the present disclosure can be set to different types according to the needs of users, and the number of classification controls can also be set to different numbers according to the needs of the users. The embodiments of the present disclosure do not specifically limit classification types.

Figure 18:
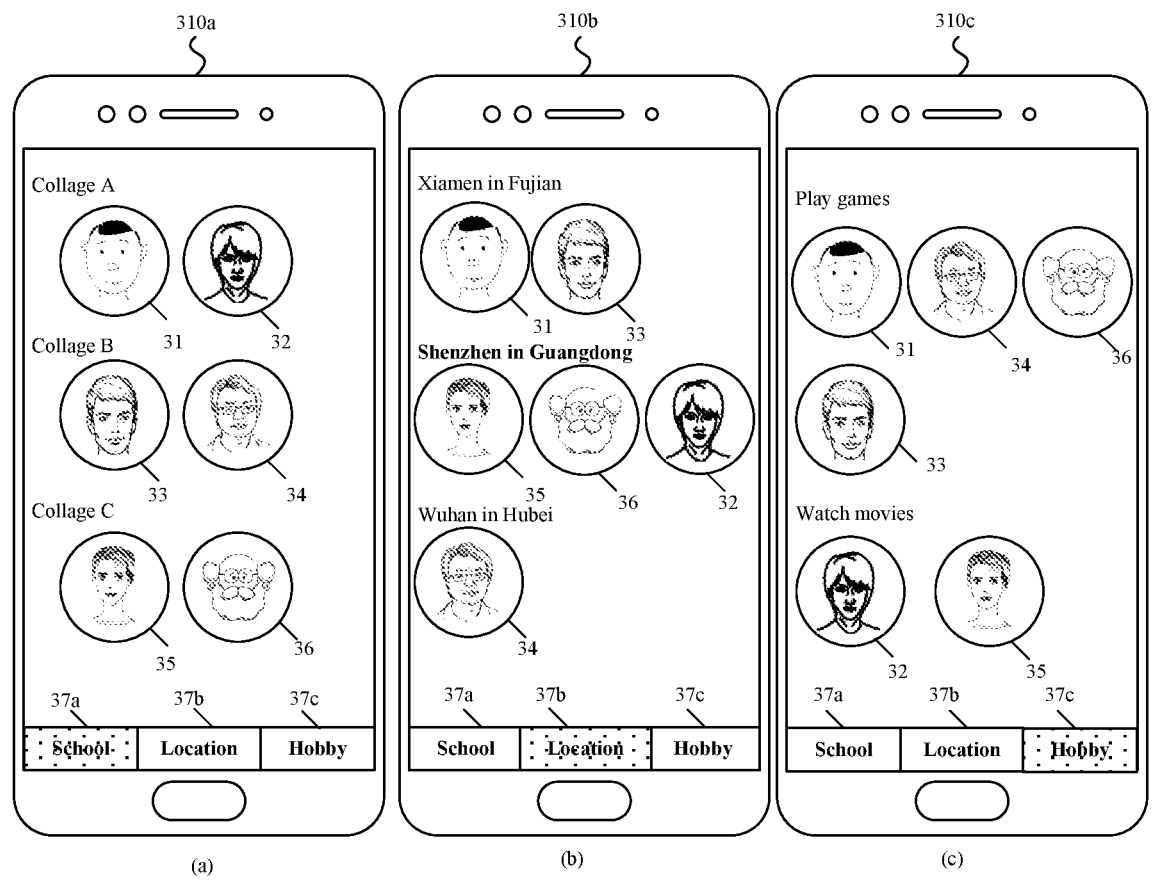
FIG. 18 is a sixteenth schematic diagram of a display interface according to an embodiment of the present disclosure.

For example, if the third interface includes at least one classification control, the third interface may also be the interface 310a shown in (a) of FIG. 18. The interface 310a includes three classification controls: a "school" control 37a, a "location" control 37b, and a "hobby" control 37c. Specifically, the interface 310a displays the interface corresponding to the "school" control 37a. The interface 310a includes three pieces of first information: school A, school B, and school C. The school of users corresponding to the face picture 31 and the face picture 32 is school A, the school of users corresponding to the face picture 33 and the face picture 34 is school B, and the school of users corresponding to the face picture 35 and the face picture 36 is school C.

Step 212: The terminal device classifies and displays the N face pictures according to R pieces of second information in response to the fifth input.

The R pieces of second information correspond to the second classification control, and both R and T are positive integers less than or equal to N.

When T<N, at least two face pictures of the N face pictures correspond to the same first information.

When R<N, at least two face pictures of the N face pictures correspond to the same second information.

It is understandable that R and T can be the same or different, which is not specifically limited in the embodiments of the present disclosure.

Specifically, when the third interface of the terminal device includes at least one classification control, the terminal device may update display of the third interface to display of a fourth interface, where the fourth interface includes the N face pictures and R pieces of second information. The N face pictures are classified and displayed on the fourth interface according to the R pieces of second information, the R pieces of second information correspond to the second classification control, and R is a positive integer.

For example, with reference to the interface 310a, when the user clicks the "location" control 37b on the interface 310a, the terminal device updates the interface 310a to the interface 310b (that is, the fourth interface) shown in (a) of FIG. 18. 3 pieces of second information are location information (that is, R=T), including Xiamen in Fujian, Shenzhen in Guangdong, and Wuhan in Hubei. The location of users corresponding to the face picture 31 and the face picture 33 is Xiamen in Fujian; the location of users corresponding to the face picture 35, the face picture 36, and the face picture 32 is Shenzhen in Guangdong; and the location of users corresponding to the face picture 34 is Wuhan in Hubei.

Similarly, when the user clicks the "hobby" control 37c on the interface 310a or the interface 310b, the terminal device can update the current display interface to the interface 310c shown in (c) in FIG. 18. 2 pieces of second information on the interface 310c are hobby information (that is, R≠T), including playing games and watching movies. The hobby of users corresponding to the face picture 31, the face picture 34, the face picture 36, and the face picture 33 is playing games; and the hobby of users corresponding to the face picture 32 and the face picture 35 is watching movies.

Based on this solution, the terminal device can classify and display, according to the needs of the user and keywords, the user information corresponding to each face picture. The user can know similar users, making it quicker and more convenient for the user to query information.

Figure 19:
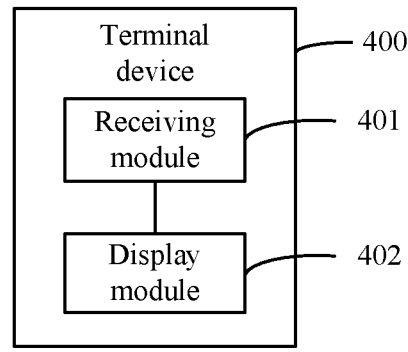
FIG. 19 is a possible schematic structural diagram of a terminal device according to an embodiment of the present disclosure.

FIG. 19 is a possible schematic structural diagram of a terminal device according to an embodiment of the present disclosure. As shown in FIG. 19, the terminal device 400 includes: a receiving module 401 and a display module 402. The receiving module 401 is configured to receive a first input that is performed by a user on a first picture. The display module 402 is configured to display M face pictures and icons of K messaging programs in response to the first input received by the receiving module 401, where the first picture includes the M face pictures. The receiving module 401 is further configured to receive a second input that is performed by the user. The display module 402 is further configured to display N face pictures and T pieces of first information in response to the second input received by the receiving module 401, where the N face pictures are face pictures that are of the M face pictures and that correspond to the second input, each piece of first information corresponds to at least one face picture, one piece of first information is information of a user indicated by at least one face picture corresponding to the first information, each piece of first information includes information in at least one first messaging program of the K messaging programs, M, K, N, and T are all positive integers, and N is less than or equal to M.

Optionally, the display module 402 is further configured to display a query control on the first interface before displaying the N face pictures and T pieces of first information. The receiving module 401 is also configured to receive an input that is performed by the user on the query control. The display module 402 is specifically configured to display N face pictures and T pieces of first information in response to the input that is performed by the user on the query control.

Optionally, the display module 402 is specifically configured to display the icons of the K messaging programs, the N face pictures, and the T pieces of first information in response to the second input received by the receiving module 401. The receiving module 401 is further configured to receive the user's third input. The display module 402 is also configured to display R pieces of second information in response to the third input received by the receiving module 401. Each face picture corresponds to one piece of second information, each piece of second information is information of a user indicated by one face picture, each piece of second information includes information in at least one second messaging program, the at least one second messaging program is a messaging program of the K messaging programs other than the at least one first messaging program, and R is a positive integer.

Optionally, the display module 402 is specifically configured to display the icons of the K messaging programs, the N face pictures, and the T pieces of first information in response to the second input received by the receiving module 401. The receiving module 401 is further configured to receive the user's third input. The display module 402 is also configured to display R pieces of second information in response to the third input received by the receiving module 401. Each face picture corresponds to one piece of second information, each piece of second information is information of a user indicated by one face picture, each piece of second information includes information in at least one second messaging program, the at least one second messaging program is a messaging program of the K messaging programs other than the at least one first messaging program, and R is a positive integer.

Optionally, the display module 402 is specifically configured to display the icons of the K messaging programs, the N face pictures, and the T pieces of first information in response to the second input received by the receiving module 401. The receiving module 401 is further configured to receive the user's third input. The display module 402 is also configured to display N pieces of first information in a first area in response to the third input received by the receiving module 401. Each face picture corresponds to one piece of second information, each piece of second information is information of a user indicated by one face picture, each piece of second information includes information in at least one second messaging program, the at least one second messaging program is a messaging program of the K messaging programs other than the at least one first messaging program, and R is a positive integer.

Optionally, each piece of first information includes the first type of information in at least one of the K messaging programs. The display module 402 is specifically configured to display the icons of the K messaging programs, the N face pictures, and the T pieces of first information in response to the second input received by the receiving module 401. The receiving module 401 is further configured to receive the user's third input. The display module 402 is also configured to display T pieces of first information and H pieces of third information in response to the third input received by the receiving module 401. Each face picture corresponds to one piece of third information, each piece of third information is information of a user indicated by one face picture, each piece of third information includes information in at least one first messaging program, each piece of third information includes the second type of information in at least one first messaging program of the K messaging programs, and H is a positive integer.

Optionally, the second input includes a first sub-input and a second sub-input. The display module 402 is specifically configured to: when a target interface displays the M face pictures and the icons of the K messaging programs, display a sub-interface including the T pieces of first information on the target interface in response to the first sub-input, and update display of the target interface and the sub-interface to display of an interface including the N face pictures and the T pieces of first information in response to the second sub-input.

Optionally, the first sub-input is an input of dragging the N face pictures to an icon of a target messaging program, the target messaging program is a messaging program of the at least one first messaging program, and each piece of first information is information in the target messaging program. When different first sub-inputs correspond to different target messaging programs, each piece of first information is information in a different target messaging program.

Optionally, the target first information includes P profile pictures, each profile picture is a profile picture in the first messaging program corresponding to the target first information, and the target first information is information of the T pieces of first information. The receiving module 401 is also configured to receive the fourth input that is performed by the user after the display module 402 displays the N face pictures and T pieces of first information. The display module 402 is also configured to update Q profile pictures of the P profile pictures to the target face picture in response to the fourth input received by the receiving module 401. The target face picture is the face picture corresponding to the target first information, the P profile pictures are profile pictures of the same user in different messaging programs, P and Q are both positive integers, and Q is equal to 1 or Q is equal to P.

Optionally, the display module 402 displays at least one classification control in response to the second input received by the receiving module 401, and classifies and displays the N face pictures according to the T pieces of first information, where the T pieces of first information correspond to a first classification control of at least one classification control, and at least two face pictures of the N face pictures correspond to the same first information. The receiving module 401 is further configured to receive a user's fifth input for a second classification control of the at least one classification control. The display module 402 is further configured to classify and display the N face pictures according to the R pieces of second information in response to the fifth input; where the R pieces of second information correspond to the second classification control, and R and T are both positive integers less than or equal to N. When T<N, at least two face pictures of the N face pictures correspond to the same first information; and when R<N, at least two face pictures of the N face pictures correspond to the same second information.

The terminal device 400 provided in this embodiment of the present disclosure can implement the processes that are implemented by the terminal device in the foregoing method embodiment. To avoid repetition, details are not described herein again.

First, the terminal device provided in the embodiments of the present disclosure receives a first input that is performed by a user on a first picture; and then displays M face pictures and icons of K messaging programs in response to the first input, where the first picture includes the M face pictures. Further, the terminal device receives a second input that is performed by the user. Finally, the terminal device displays N face pictures and T pieces of first information in response to the second input. One piece of first information is information of a user indicated by at least one face picture corresponding to the first information, and each piece of first information includes information in at least one first messaging program of the K messaging programs. Because the terminal device can display, based on a face picture in a picture, information of a user in a messaging program corresponding to the face picture, a user can quickly determine, according to the information of the user displayed on the terminal device, whether the user is a contact that the user needs to search for, and there is no need to manually search a large amount of information. Therefore, in the information display method provided in the embodiments of the present disclosure, query is fast and accuracy of the query result is high.

Figure 20:
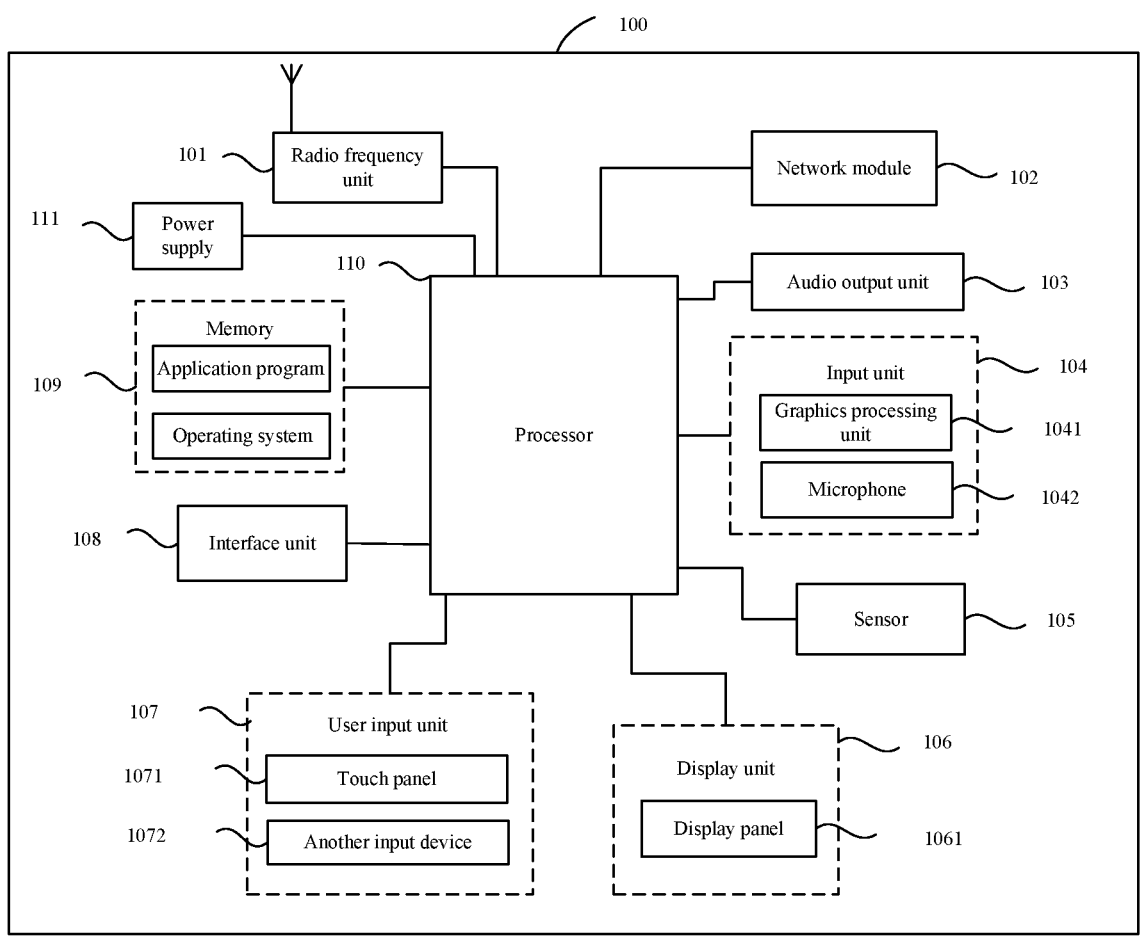
FIG. 20 is a schematic diagram of a hardware structure of a terminal device according to various embodiments of the present disclosure.

FIG. 20 is a schematic diagram of a hardware structure of a terminal device implementing the various embodiments of the present disclosure. The terminal device 100 includes, but not limited to: a radio frequency unit 101, a network module 102, an audio output unit 103, an input unit 104, a sensor 105, a display unit 106, a user input unit 107, an interface unit 108, a memory 109, a processor 110, a power supply 111, and the like. A person skilled in the art may understand that the structure of the terminal device shown in FIG. 20 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 107 is configured to receive a first input that is performed by a user on a first picture; the display unit 106 is configured to display M face pictures and icons of K messaging programs in response to the first input, where the first picture includes the M face pictures; the user input unit 107 is further configured to receive a second input that is performed by the user; and the display unit 106 is further configured to display N face pictures and T pieces of first information in response to the second input, where the N face pictures are face pictures that are of the M face pictures and that correspond to the second input, each piece of first information corresponds to at least one face picture, one piece of first information is information of a user indicated by at least one face picture corresponding to the first information, each piece of first information includes information in at least one first messaging program of the K messaging programs, M, K, N, and T are all positive integers, and N is less than or equal to M.

First, the terminal device provided in the embodiments of the present disclosure receives a first input that is performed by a user on a first picture; and then displays M face pictures and icons of K messaging programs in response to the first input, where the first picture includes the M face pictures. Further, the terminal device receives a second input that is performed by the user. Finally, the terminal device displays N face pictures and T pieces of first information in response to the second input. One piece of first information is information of a user indicated by at least one face picture corresponding to the first information, and each piece of first information includes information in at least one first messaging program of the K messaging programs. Because the terminal device can display, based on a face picture in a picture, information of a user in a messaging program corresponding to the face picture, a user can quickly determine, according to the information of the user displayed on the terminal device, whether the user is a contact that the user needs to search for, and there is no need to manually search a large amount of information. Therefore, in the information display method provided in the embodiments of the present disclosure, query is fast and accuracy of the query result is high.

It should be understood that, in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communication system and network.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. In addition, the audio output unit 103 may further provide audio output (for example, call signal receiving sound or message receiving sound) related to a specific function performed by the terminal device 100. The audio output unit 103 includes a speaker, a buzzer, a telephone receiver, and the like.

The input unit 104 is configured to receive audio or video signals. The input unit 104 may include a Graphics Processing Unit (GPU) 1041 and a microphone 1042. The graphics processing unit 1041 processes picture data of a static picture or a video obtained by an picture capture apparatus (for example, a camera) in video capture mode or picture capture mode. A processed picture frame may be displayed on the display unit 106. The picture frame processed by the graphics processing unit 1041 may be stored in the memory 109 (or another storage medium) or sent via the radio frequency unit 101 or the network module 102. The microphone 1042 may receive a sound and can process such sound into audio data. The audio data obtained through processing may be converted, in a telephone call mode, into a format that can be sent to a mobile communications base station via the radio frequency unit 101 for output.

The terminal device 100 further includes at least one sensor 105, such as an optical sensor, a motion sensor, and other sensors. Specifically, the optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of the motion sensor, an accelerometer sensor may detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by a user or information provided to a user. The display unit 106 may include a display panel 1061, and the display panel 1061 may be configured in a form of Liquid Crystal Display (LCD), Organic Light-Emitting Diode (OLED), or the like.

The user input unit 107 may be configured to receive input numeral or character information, and generate key signal input related to user setting and function control of the terminal device. Specifically, the user input unit 107 includes a touch panel 1071 and another input device 1072. The touch panel 1071, also called a touch screen, may collect a touch operation of the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 110, receives a command sent by the processor 110, and executes the command. In addition, the touch panel 1071 may be implemented by using a plurality of types such as a resistive type, a capacitive type, an infrared ray, and a surface acoustic wave. In addition to the touch panel 1071, the user input unit 107 may further include the another input device 1072. Specifically, the another input device 1072 may include but is not limited to one or more of a physical keyboard, a function key (such as a volume control key or an on/off key), a trackball, a mouse, a joystick, and the like. Details are not described herein.

Further, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 20, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required by at least one function (such as a sound play function or a picture play function), and the like. The data storage area may store data (such as audio data or an address book) created based on use of the mobile phone, and the like. In addition, the memory 109 may include a high-speed random access memory, and may further include a non-volatile memory such as at least one magnetic disk storage component, a flash memory component, or another volatile solid-state storage component.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application program, and the like, and the modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of this disclosure further provides a terminal device. With reference to FIG. 20, the terminal device includes the processor 110, the memory 109, and a computer program stored in the memory 109 and capable of running on the processor 110. When the computer program is executed by the processor 110, the processes of the foregoing embodiments of the information display method are implemented, and the same technical effects can be achieved. To avoid repetition, details are not described herein again.

An embodiment of the present disclosure further provides a computer-readable storage medium. The computer-readable storage medium stores a computer program. When the computer program is executed by a processor, the processes of the foregoing embodiments of the information display method are implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. An information display method, applied to a terminal device, the method comprising:
receiving a first input that is performed by a user on a first picture;
displaying M face pictures and icons of K messaging programs in response to the first input, wherein the first picture comprises the M face pictures and the K messaging programs comprise contact information;
receiving a second input that is performed by the user, wherein the second input is an input that selects N face pictures from the M face pictures and at least one first messaging program of the K messaging programs, wherein the second input comprises a first sub-input and a second sub-input, the first sub-input is an input for dragging the N face pictures simultaneously to an icon of a target messaging program, the target messaging program is a messaging program of the at least one first messaging program; and
displaying the N face pictures and T pieces of first information corresponding to each of the N face pictures in response to the second input, wherein: each of the N face pictures corresponds to T pieces of first information comprising a profile picture, a nickname, an account number, and a status of the user indicated by said face picture; and M, K, N, and T are all positive integers, M is larger than 1, and N is larger than 1 but less than or equal to M.

2. The information display method according to claim 1, wherein the displaying N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
the information display method further comprises:
receiving a third input that is performed by the user; and
displaying R pieces of second information in response to the third input,
wherein each face picture of the N face pictures corresponds to one piece of second information, each piece of second information is information of the user indicated by one face picture, each piece of second information comprises information in at least one second messaging program, the at least one second messaging program is a messaging program of the K messaging programs other than the at least one first messaging program, and R is a positive integer.

3. The information display method according to claim 1, wherein the displaying N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
the information display method further comprises:
receiving a third input that is performed by the user; and
displaying R pieces of second information in response to the third input,
wherein each face picture of the N face pictures corresponds to one piece of second information, each piece of second information is information of the user indicated by one face picture, each piece of second information comprises information in at least one second messaging program and information in at least one first messaging program, the at least one second messaging program is a messaging program of the K messaging programs other than the at least one first messaging program, and R is a positive integer.

4. The information display method according to claim 1, wherein the displaying N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
the information display method further comprises:
receiving a third input that is performed by the user; and
displaying N pieces of first information in a first area and displaying R pieces of second information in a second area in response to the third input;
wherein each face picture of the N face pictures corresponds to one piece of second information, each piece of second information is information of the user indicated by one face picture, each piece of second information comprises information in at least one second messaging program, the at least one second messaging program is a messaging program of the K messaging programs other than the at least one first messaging program, and R is a positive integer.

5. The information display method according to claim 1, wherein each piece of first information comprises first type of information in the at least one first messaging program of the K messaging programs;
the displaying N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
the information display method further comprises:
receiving a third input that is performed by the user; and
displaying the T pieces of first information and H pieces of third information in response to the third input;
wherein each face picture of the N face pictures corresponds to one piece of third information, each piece of third information is information of the user indicated by one face picture, each piece of third information comprises information in the at least one first messaging program, each piece of third information comprises second type of information in the at least one first messaging program of the K messaging programs, and H is a positive integer.

6. The information display method according to claim 1, wherein
the displaying N face pictures and T pieces of first information corresponding to each of the N face pictures in response to the second input comprises:
when a target interface displays the M face pictures and the icons of the K messaging programs, displaying a sub-interface comprising the T pieces of first information corresponding to each of the N face pictures on the target interface in response to the first sub-input; and
updating display of the target interface and the sub-interface to display of an interface comprising the N face pictures and the T pieces of first information corresponding to each of the N face pictures in response to the second sub-input.

7. The information display method according to claim 6, wherein each piece of first information is information in the target messaging program;
wherein when different first sub-inputs correspond to different target messaging programs, each piece of first information is information in different target messaging programs.

8. The information display method according to claim 1, wherein a target first information comprises P profile pictures, each profile picture is a profile picture in a first messaging program corresponding to the target first information, and the target first information is information of the T pieces of first information; and
after the displaying the N face pictures and the T pieces of first information corresponding to each of the N face pictures, the information display method further comprises:
receiving a fourth input that is performed by the user; and
updating Q profile pictures of the P profile pictures to a target face picture in response to the fourth input, wherein the target face picture is a face picture corresponding to the target first information;
wherein the P profile pictures are profile pictures of a same user in different messaging programs, P and Q are both positive integers, and Q is equal to 1 or Q is equal to P.

9. A terminal device, comprising a processor, a memory, and a computer program stored in the memory and executable on the processor, wherein the computer program, when executed by the processor, causes the processor to perform:
receiving a first input that is performed by a user on a first picture;
displaying M face pictures and icons of K messaging programs in response to the first input, wherein the first picture comprises the M face pictures and the K messaging programs comprise contact information;
receiving a second input that is performed by the user, wherein the second input is an input that selects N face pictures from the M face pictures and at least one first messaging program of the K messaging programs, wherein the second input comprises a first sub-input and a second sub-input, the first sub-input is an input for dragging the N face pictures simultaneously to an icon of a target messaging program, and the target messaging program is a messaging program of the at least one first messaging program; and
displaying the N face pictures and T pieces of first information corresponding to each of the N face pictures in response to the second input,
wherein:
each of the N face pictures corresponds to T pieces of first information comprising a profile picture, a nickname, an account number, and a status of the user indicated by said face picture; and
M, K, N, and T are all positive integers, M is larger than 1, and N is larger than 1 but less than or equal to M.

10. The terminal device according to claim 9, wherein displaying the N face pictures and T pieces of first information corresponding to each of the N face pictures in response to the second input comprises:
displaying the icons of the K messaging programs, the N face pictures, and the T pieces of first information corresponding to each of the N face pictures in response to the second input; and wherein the processor is further configured to:
receive a third input that is performed by the user; and
display R pieces of second information in response to the third input,
wherein each face picture of the N face pictures corresponds to one piece of second information, each piece of second information is information of the user indicated by one face picture, each piece of second information comprises information in at least one second messaging program, the at least one second messaging program is a messaging program of the K messaging programs other than the at least one first messaging program, and R is a positive integer.

11. The terminal device according to claim 9, wherein displaying the N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
wherein the processor is further configured:
receive a third input that is performed by the user; and
display R pieces of second information in response to the third input,
wherein each face picture of the N face pictures corresponds to one piece of second information, each piece of second information is information of the user indicated by one face picture, each piece of second information comprises information in at least one second messaging program and information in at least one first messaging program, the at least one second messaging program is a messaging program of the K messaging programs other than the at least one first messaging program, and R is a positive integer.

12. The terminal device according to claim 9, wherein displaying the N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
wherein the processor is further configured to:
receive a third input that is performed by the user; and
display N pieces of first information in a first area and display R pieces of second information in a second area in response to the third input;
wherein each face picture of the N face pictures corresponds to one piece of second information, each piece of second information is information of the user indicated by one face picture, each piece of second information comprises information in at least one second messaging program, the at least one second messaging program is a messaging program of the K messaging programs other than the at least one first messaging program, and R is a positive integer.

13. The terminal device according to claim 9, wherein each piece of first information comprises first type of information in the at least one first messaging program of the K messaging programs;
wherein displaying the N face pictures and T pieces of first information corresponding to each of the N face pictures in response to the second input comprises:
displaying the icons of the K messaging programs, the N face pictures, and the T pieces of first information corresponding to each of the N face pictures in response to the second input; and
wherein the processor is further configured to:
receive a third input that is performed by the user; and
display the T pieces of first information and H pieces of third information in response to the third input,
wherein each face picture of the N face pictures corresponds to one piece of third information, each piece of third information is information of the user indicated by one face picture, each piece of third information comprises information in at least one first messaging program, each piece of third information comprises second type of information in the at least one first messaging program of the K messaging programs, and H is a positive integer.

14. The terminal device according to claim 9,
wherein displaying the N face pictures and T pieces of first information corresponding to each of the N face pictures in response to the second input comprises:
when a target interface displays the M face pictures and the icons of the K messaging programs, displaying a sub-interface comprising the T pieces of first information corresponding to each of the N face pictures on the target interface in response to the first sub-input; and
update display of the target interface and the sub-interface to display of an interface comprising the N face pictures and the T pieces of first information corresponding to each of the N face pictures in response to the second sub-input.

15. The terminal device according to claim 14, wherein each piece of first information is information in the target messaging program,
wherein when different first sub-inputs correspond to different target messaging programs, each piece of first information is information in different target messaging programs.

16. The terminal device according to claim 9, wherein a target first information comprises P profile pictures, each profile picture is a profile picture in a first messaging program corresponding to the target first information, and the target first information is information of the T pieces of first information; and
after displaying the N face pictures and the T pieces of the first information corresponding to each of the N face pictures, the processor is further configured to:
receive a fourth input that is performed by the user; and
update Q profile pictures of the P profile pictures to a target face picture in response to the fourth input, wherein the target face picture is a face picture corresponding to the target first information,
wherein the P profile pictures are profile pictures of a same user in different messaging programs, P and Q are both positive integers, and Q is equal to 1 or Q is equal to P.

17. A non-transitory computer-readable storage medium, wherein the computer-readable storage medium stores a computer program, and when the computer program is executed by a processor, causes the processor to:
receive a first input that is performed by a user on a first picture;
display M face pictures and icons of K messaging programs in response to the first input, wherein the first picture comprises the M face pictures and the K messaging programs comprise contact information;
receive a second input that is performed by the user, wherein the second input is an input that selects N face pictures from the M face pictures and at least one first messaging program of the K messaging programs, wherein the second input comprises a first sub-input and a second sub-input, the first sub-input is an input for dragging the N face pictures simultaneously to an icon of a target messaging program, and the target messaging program is a messaging program of the at least one first messaging program; and display N face pictures and T pieces of first information corresponding to each of the N face pictures in response to the second input, wherein:

each of the N face pictures corresponds to T pieces of first information comprising a profile picture, a nickname, an account number, and a status of the user indicated by said face picture; and M, K, N, and T are all positive integers, M is larger than 1, and N is larger than 1 but less than or equal to M.

18. The non-transitory computer-readable storage medium according to claim 17, wherein to display N face pictures and T pieces of first information corresponding to each of the N face pictures in response to the second input, the processor is further configured to display the icons of the K messaging programs, the N face pictures, and the T pieces of first information corresponding to each of the N face pictures in response to the second input; and wherein the processor is further configured to:

receive a third input that is performed by the user; and display R pieces of second information in response to the third input, wherein each face picture corresponds to one piece of second information, each piece of second information is information of the user indicated by one face picture, each piece of second information comprises information in at least one second messaging program, the at least one second messaging program is a messaging program of the K messaging programs other than the at least one first messaging program, and R is a positive integer.

* * * * *